United States Patent [19]

Muhs et al.

[11] Patent Number: 5,374,821

[45] Date of Patent: Dec. 20, 1994

[54] ELASTOMERIC OPTICAL FIBER SENSORS AND METHOD FOR DETECTING AND MEASURING EVENTS OCCURRING IN ELASTIC MATERIALS

[75] Inventors: Jeffrey D. Muhs, Lenoir City; Gary J. Capps, Knoxville; David B. Smith, Oak Ridge; Clifford P. White, Knoxville, all of Tenn.

[73] Assignee: Martin Marietta Energy Systems, Inc., Oak Ridge, Tenn.

[21] Appl. No.: 86,444

[22] Filed: Jun. 30, 1993

[51] Int. Cl.$^5$ ................................. H01J 5/16
[52] U.S. Cl. ................................. 250/227.16; 73/800
[58] Field of Search ............ 250/227.16, 227.14, 250/231.19; 73/800, 862.624; 385/13, 32

[56] References Cited

U.S. PATENT DOCUMENTS

| | | |
|---|---|---|
| 4,560,016 | 12/1985 | Ibanez et al. |
| 4,734,577 | 3/1988 | Szuchy |
| 4,830,461 | 5/1989 | Ishihardada et al. |
| 4,915,473 | 4/1990 | Haese et al. ............ 250/231.19 |
| 4,937,029 | 6/1990 | Ishihardada et al. |
| 5,222,165 | 6/1993 | Bohlinger ............ 250/231.19 |
| 5,240,643 | 8/1993 | Buckley et al. ............ 385/13 |

OTHER PUBLICATIONS

"Silicone Rubber Fiber Optic Sensors" by Jeffrey D. Muhs, Reprint from Jul. 1992 issue of Photonics Spectra, Laurin Publishing Co. Inc.

Primary Examiner—David C. Nelms
Assistant Examiner—K. Shami
Attorney, Agent, or Firm—Earl Larcher; Joseph A. Marasco; W. Mark Bielawski

[57] ABSTRACT

Fiber optic sensing means for the detection and measurement of events such as dynamic loadings imposed upon elastic materials including cementitious materials, elastomers, and animal body components and/or the attrition of such elastic materials are provided. One or more optical fibers each having a deformable core and cladding formed of an elastomeric material such as silicone rubber are embedded in the elastic material. Changes in light transmission through any of the optical fibers due the deformation of the optical fiber by the application of dynamic loads such as compression, tension, or bending loadings imposed on the elastic material or by the attrition of the elastic material such as by cracking, deterioration, aggregate break-up, and muscle, tendon, or organ atrophy provide a measurement of the dynamic loadings and attrition. The fiber optic sensors can be embedded in elastomers subject to dynamic loadings and attrition such as commonly used automobiles and in shoes for determining the amount and frequency of the dynamic loadings and the extent of attrition. The fiber optic sensors are also useable in cementitious material for determining the maturation thereof.

50 Claims, 12 Drawing Sheets

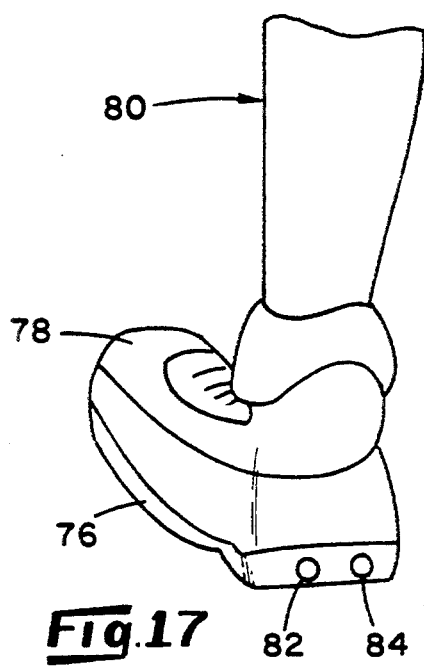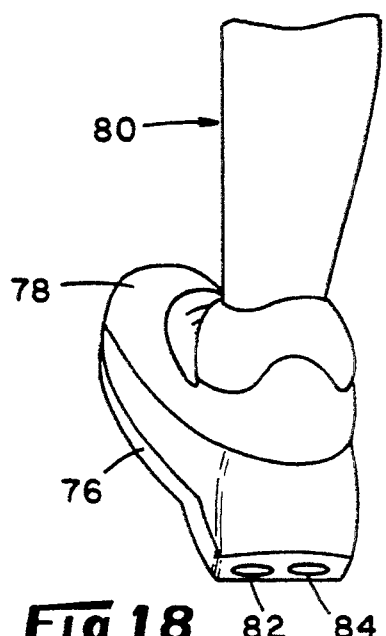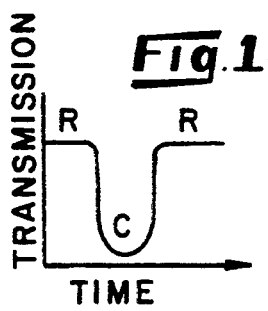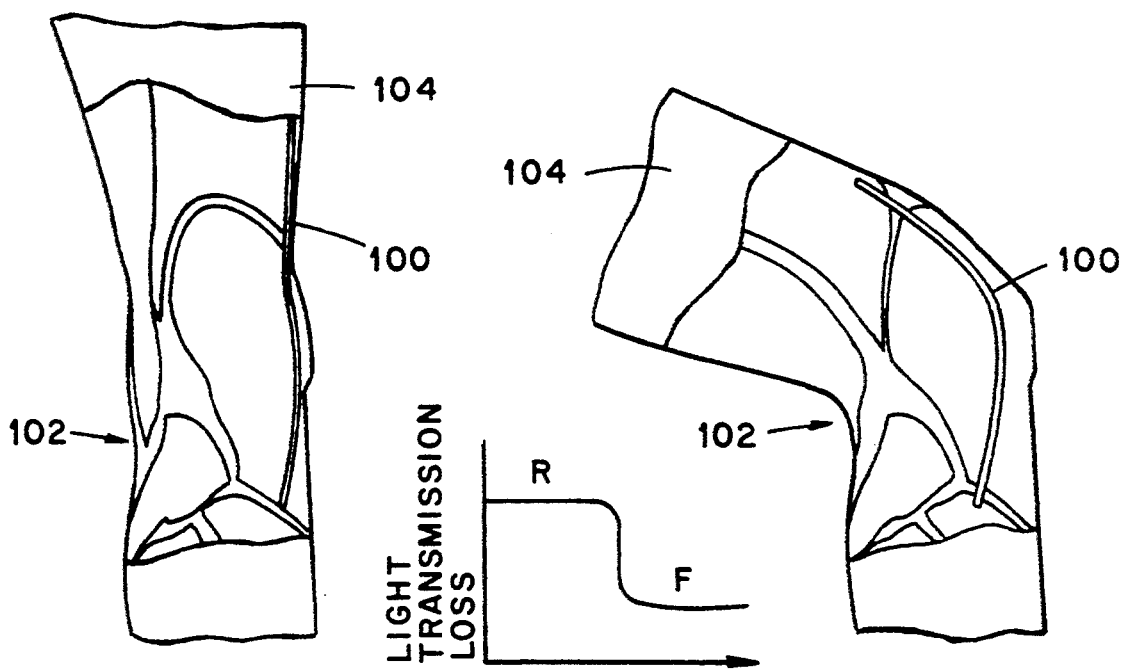
Fig.17　Fig.18　Fig.19　Fig.21　Fig.23　Fig.22

ELASTOMERIC OPTICAL FIBER SENSORS AND METHOD FOR DETECTING AND MEASURING EVENTS OCCURRING IN ELASTIC MATERIALS

BACKGROUND OF THE INVENTION

The present invention relates generally to optical fiber sensors for detecting, measuring, and monitoring dynamic events and changes in properties occurring within elastic material subject to strain and/or attrition or development. More particularly, the present invention is directed to optical fiber sensors formed of deformable elastomeric materials embedded within elastic materials such as aggregates including asphaltic and cementitious materials, elastomers, or within the body of an animal for detecting, measuring, and monitoring dynamic loads such as compression, stretching or bending loadings occurring within the elastic materials, and/or the attrition or deterioration of the elastic material such as caused by cracking, aging, aggregate break-up, moisture infiltration, disintegration of the material, or the development of the elastic materials such as caused by increased growth in animal muscles and organs.

This invention was made with the support of the United States Government under contract No. DE-AC05-84OR21400 awarded by the U.S. Department of Energy. The United States Government has certain rights in this invention.

Optical fibers are becoming of increasing interest in the development of sensors used for the detection and measurement of various events which apply strain to a material supposing the fiber optic sensor whereby attenuation of the light transmitted through the optical fiber is indicative of the amount of strain applied to the material. For example, optical fiber sensors have been developed in use for weighing vehicles in motion by arranging a selected array of fiber optic sensors along a roadway in the path of a moving vehicle. One such optical fiber sensor arrangement for weighing vehicles in motion is described in a commonly assigned and allowed U.S. Patent application entitled, "Apparatus For Weighing and Identifying Characteristics of a Moving Vehicle", J. D. Muhs et al, Ser. No. 07/864,888, filed Apr. 4, 1992. This commonly assigned patent application is incorporated herein by reference.

In other recent developments in which optical fibers are used in sensors designed to detect and quantify forces applied to the surface regions of various engineering structures such as bridges, aircraft components, vehicle bumpers, and the like is described in U.S. Pat. No. 4,734,577. In this patent, optical fibers formed of glass or plastic are attached to the surface of or encased in the structure that is to be monitored and are so mounted so as to have at least one flexible or curved section thereon, preferably a plurality of curved sections, so that any bending or straightening of the curved optical fibers due to surface motion in the structure or material being monitored will affect the radius of the curved section or sections and thereby change the amount of light being transmitted through the optical fiber. The amount of change in light transmission is indicative of the applied load. While such an optical fiber sensor arrangement provides satisfactory results when attached to the surface of the material to be monitored, some drawbacks or shortcomings are inherently present when attempting to embed the optical fiber in many materials. For example, during the curing of various structural materials such as asphalt or cementitiuous materials including concrete, mortar, and grout, and elastomers such as synthetic rubbers and various other polymers such as urethanes and polyethylene, various glass or plastic fiber-damaging forces such as caused by the expansion or shrinkage of the material will be imposed upon the glass or plastic fibers. Also, efforts to provide the glass or plastic optical fibers with the desired degree and number of bends would be difficult to achieve when attempting to embed the optical fibers in liquidous materials such as freshly poured concrete or pre-cured elastomeric materials. Furthermore, the sensitivity of such sensors in embedded arrangements is likely to be impractical since glass and plastic optical fibers are nondeformable and are not generally considered generally to possess the dynamic range and/or sensitivity for accurately sensing highly elastic or fracture prone materials.

Another development in optical fibers and optical fiber sensors which is of significant interest to the present invention is described in U.S. Pat. Nos. 4,830,461 and 4,937,029. For the purpose of this description these patents will be hereinafter referred to as the "Bridgestone" patents, the name of the assignee thereof. The optical fibers described in these patents are formed of a core and cladding of a relatively transparent elastomer such as a synthetic rubber selected from chloroprene rubber, urethane rubber, silicone rubber, acrylic rubber, fluorene rubber, ethylene-propylene rubber, ethylene-propylene diene, terpolymer rubber, and epichlorohydrin rubber. In these patents the pressure-sensitive sensors employing the optical fibers of the listed rubber elastomers are placed on a surface of a structure so that when a strain such as compression or tension or that of a bending force is imposed upon the structure, the optical fiber becomes deformed by changing the cross-section under a compression or tension loading or by bending the optical fiber. Such deformation of the optical fiber attenuates the light passing therethrough according to the amount of bending or strain applied to the optical fiber. While the pressure-sensitive optical fiber sensors in these Bridgestone patents provide several advantages over previously known pressure-sensitive sensors using optical fibers formed of glass or plastic, there are several significant areas in material behavior which have yet to be successfully monitored and measured by fiber optic sensors. For example, in the Bridgestone patents the pressure-sensitive sensors are not fixedly embedded in the structure being monitored and are thus incapable of undergoing virtually similar conjunctive displacement with the structure being monitored in response to dynamic loadings or a bending force being applied to the structure, especially at locations internal of the surface regions of the structure, and are thus of a sensitivity often less than desired for many applications. For example, such previously known pressure-sensitive sensors would be substantially incapable of detecting the formation of a crack in the structure supporting the optical fiber sensor, accurately measuring impact loadings such as caused by the foot of a human being impacting upon an elastic sole of a shoe, or strain on animal components such as muscles and organs. Also, with the previous pressure-sensitive sensors any attrition and/or development in the structure could not be accurately detected, let alone accurately measured. The detection of cracks and attrition in elastic materials such as cementitious materials and elastomers including synthetic rubbers and various plastics such as urethanes and polyethylene and the providing of highly accurate measurements of dynamic loadings, however slight, occurring in internal regions of the material being monitored is of considerable importance in determining the functional operation and the useful life of such elastic materials.

These Bridgestone patents at column 2, lines 23–52, point out further shortcomings of using optical fibers of grass or plastic in pressure-sensitive monitors such as described in aforementioned U.S. Pat. No. 4,734,517. Also, since the optical fibers described in Bridgestone patents with the core or cladding formed of the rubber elastomeric material are descriptive of the optical fibers used in the various embodiments of the present invention, these Bridgestone patents are specifically incorporated herein by reference.

SUMMARY OF THE INVENTION

The principal aim of the present invention is to substantially overcome or obviate the problems and shortcomings found to be present in previously known pressure-sensitive sensors employing optical fibers such as described above. Accordingly, it is an object of the present invention to provide an optical fiber sensor for accurately measuring dynamic loadings provided by compression, tension, or bending forces being applied to a body of elastic material and/or the attrition or development of the elastic material with such attrition or development being measured with or without concurrent dynamic loadings.

Generally, in a first aspect of the present invention used for measuring a dynamic loading applied to a body of elastic material, the optical fiber sensors comprise elongated optical fiber means formed of a core and cladding of an elastomeric material and sufficiently fixedly embedded within a body of elastic material for conjunctive displacement therewith. Thus, any movement in internal regions of the body of elastic material contiguous to regions of the embedded optical fiber means upon the application of a dynamic loading to the body of elastic material deforms the optical fiber means at a location thereon corresponding to the location of the movement in these regions. The amount of this deformation substantially corresponds to the extent of movement in the body of elastic material in the internal regions. Light producing means are coupled to the embedded optical fiber means for transmitting light therethrough, and light receiving means are coupled to the embedded optical fiber means for receiving the light transmitted therethrough with the amount of light received thereby being proportional to the amount of deformation of the optical fiber means for providing a signal indicative of the extent of movement occurring in the internal regions of the body of elastic material.

In a second aspect of the present invention used for measuring attrition in a body of elastic material, the optical fiber means embedded within the body of elastic material for conjunctive movement therewith are subjected to an initial amount of deformation so that any attrition in internal regions of the body of elastic material contiguous to regions of the embedded optical fiber means in the body of elastic material changes this initial amount of deformation in the optical fiber means at a location thereon corresponding to the location of the attrition in the body of elastic material with the amount of the change in the initial deformation substantially corresponding to the extent of attrition in the body of elastic material.

In a third and most preferred aspect of the present invention, the optical fiber sensor measures both the attrition of and the dynamic loadings applied to a body of elastic material with the elongated optical fiber fixedly embedded in and subjected to an initial amount of deformation within the body of elastic material. Any changes in the initial amount of deformation in the optical fiber means as caused by attrition of the body of elastic material or by movement in internal regions of the body of elastic material contiguous to regions of the embedded optical fiber means upon the application of a dynamic loading to the body of elastic material will alter the amount of the initial deformation in the optical fiber means according to whether the change is due to attrition of or to a dynamic loading applied to the body of elastic material.

The operation of the optical fiber sensor of the present invention, which provides for detecting and measuring at least one of attrition in a body of elastic material and a dynamic loading imposed upon the body of elastic material by at least one of a compression lead, a tension lead, or a bending lead, comprises the steps of: fixedly embedding an elongated optical fiber means formed of a core and cladding of an elastomeric material within the body of elastic material for conjunctive movement therewith and for subjecting the elongated optical fiber means to an initial deformation; transmitting light through the embedded optical fiber means measuring the amount of light initially transmitted through the embedded optical fiber means with the amount of light being initially transmitted being indicative of the amount of attenuation of the light through the optical fiber means caused by the initial deformation thereof; measuring the amount of light subsequently transmitted through the embedded optical fiber means so that any changes in the initial amount of deformation in the optical fiber means as caused by at least one of the attrition of the body of elastic material and movement in internal regions of the body of elastic material contiguous to regions of the embedded optical fiber means upon the application of a dynamic loading to the body of elastic material changes the amount of light attenuation measured at the initial deformation of the optical fiber means, The extent of any change in the amount of light attenuation from that initially measured is indicative of the extent of attrition in the elastic material or the extent of movement in the body of elastic material at locations thereof contiguous to the embedded optical fiber means as caused by the application of a dynamic loading to the body of elastic material.

Another object of the present invention is to provide a fiber optic sensor and method for detecting and measuring cracks occurring in a body of cementitious material such as concrete, mortar, or grout by embedding at least one elastomeric optical fiber in a cementitious material so as to span regions thereof most likely subject to cracking whereby the formation of a crack deforms the optical fiber under a tension loading for providing a signal indicative of the crack properties at a general location.

Another object of the present invention is to provide an optical fiber sensor and method for monitoring the maturation or curing rate of a water-containing elastic material such as concrete by embedding an elongated optical fiber means formed of a core and cladding of an elastomeric material within a body of freshly poured and uncured concrete containing a substantial amount of water. Light is transmitted through the embedded optical fiber means. Means are provided for measuring the amount of light initially transmitted through the embedded optical fiber means with the amount of light attenuation being indicative of the amount of water present, whereby any changes in the amount of light subsequently transmitted through the embedded optical fiber means is indicative of the extent of curing taking place in the concrete while the rate of the change in the amount of light being transmitted through the optical fiber means is indicative of the rate of the curing taking place in the concrete.

Another object of the present invention is to provide an optical sensor and method for substantially detecting the location of dynamic loadings and the location, width and length of cracks formed in cementitious material by embedding a plurality of optical fibers in a laterally spaced apart, substantially parallel relationship to one another in the cementitious material and measuring light attenuation at each optical fiber. A further plurality of substantially parallel, laterally spaced optical fibers can be embedded perpendicular to the first plurality of optical fibers provides for increasing the resolution as to the location and the dimension of events occurring in the cementitious material.

A further object of the present invention is to provide a fiber optic sensor and method for monitoring and measuring dynamic loadings applied to and the attrition of an elastomeric material including synthetic rubbers and polymers such as polyurethane and polyethylene. These elastomeric materials are typically of the type used for various mounting and shock absorbing applications in vehicles including automobiles and aircraft, building supports, soles of shoes, and other support structures. By monitoring and measuring the dynamic loadings such as the number of dynamic loadings occurring within a particular time frame, especially loadings in excess of desired or design loadings, and the attrition occurring in the elastomeric material, the replacement of the structure of elastomeric material can be affected before its function is substantially compromised.

A still further object of the present invention is to provide an optical fiber sensor and method for measuring events occurring in internal body parts of an animal such as a laboratory or research animal or in a human being. Such events include the detecting, measuring, and monitoring of the magnitude of muscle or organ flexure or relaxation, the number of muscle or organ flexures or relaxations, the attrition or atrophy, or the growth of such muscles and organs. Also, with the optical fiber sensor embedded in an animal body for conjunctive movement with a tumor or other abnormal growth, a significant medical diagnostical tool is provided for closely monitoring the growth or attrition of the tumor or the like. This in-vivo use the sensor facilitates accurate monitoring and measurement of movement or atrophy of the internal body parts so as to be particularly useful for physical therapy and for various medical diagnostics research programs, especially those involved with the workings of the various internal components of the animal body.

Other and further objects of the present invention will become obvious upon an understanding of the illustrative embodiments and method about to be described or will be indicated in the appended claims, and various advantages not referred to herein will occur to one skilled in the art upon employment of the invention in practice.

DESCRIPTION OF THE DRAWINGS

FIGS. 17 and 18 schematically illustrate a further embodiment of the present invention wherein the optical fiber sensors are embedded in the sole of a shoe for monitoring force loadings imposed upon the sole of the shoe and the attrition of the sole during recreational uses or orthopedic rehabilitation exercises;

FIG. 19 is a graph illustrating the amount of light transmission loss occurring during an impact loading such as caused by the weight on the sole during a training exercise;

FIGS. 21 and 22 are illustrative of a further embodiment of the present invention wherein the optical fiber sensors are embedded in the knee region of a human body for in-vivo diagnostics;

FIG. 23 is a graph illustrating the amount of light transmission loss occurring during the flexure of the knee as indicated by the FIG. 22;

Figure 1:
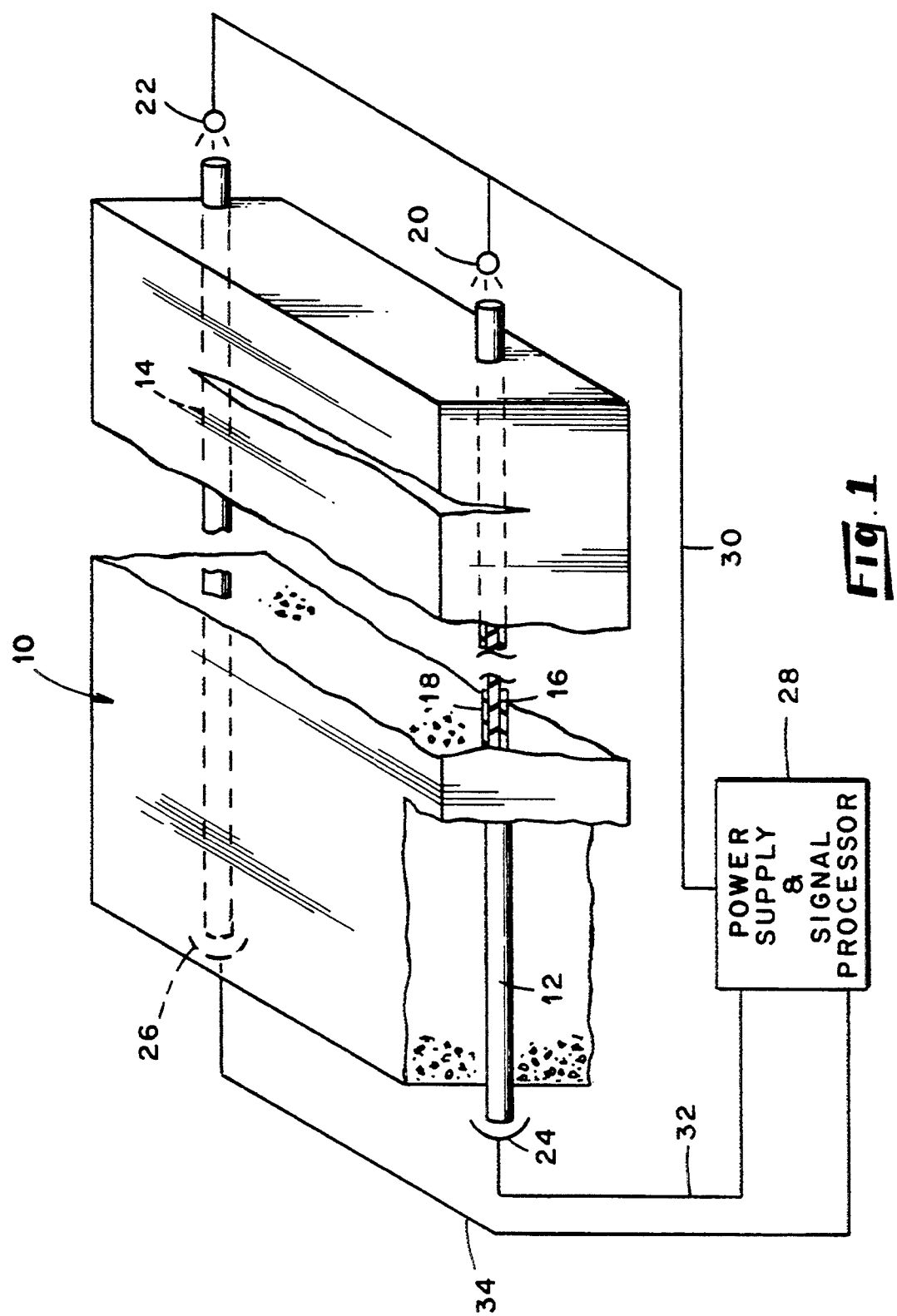
FIG. 1 is a schematic illustration, partly broken away, showing the optical fiber sensor of the present invention in a crack-containing concrete slab.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE PREFERRED EMBODIMENTS OF THE INVENTION

As generally described above, the present invention is directed to optical fiber sensors of elastomeric materials embedded in various elastic materials for detecting, measuring and monitoring dynamic loads applied to the elastic material or the attrition (or growth) occurring in the elastic material. Preferably, the present invention is directed to the detecting, measuring and monitoring of both the dynamic loadings and to the attrition of the elastic material. The optical fibers employed in the embodiments of the invention as will be described below are formed of the type of elastomeric materials described in the aforementioned Bridgestone patents. In the present invention, preferably at least one of the core and the cladding is formed of silicone rubber and more preferably, both the core and the cladding are formed of silicone rubber, especially in the embodiment where the optical fibers are embedded in the body of an animal. In each of the embodiments of the present invention, the one or more optical fibers, which are usually of a diameter in the range of about 0.1 to 10 mm, are placed within the elastic material for conjunctive displacement therewith for varying the light transmission or attenuation of the light in regions of the elastic material contiguous to the optical fiber for changing or varying the light transmission through the optical fiber in response to events occurring in the elastic material such as caused by strain loadings defined by compression and tension imposed upon the elastic material, the bending of the elastic material, and deterioration or attrition of the elastic material such as evidenced therein by the formation of cracks, decrease in elasticity, shrinkage, expansion, and the breaking up or disintegration of elastic material. The optical fibers useful in the present invention are illustrated as being of a circular configuration, but it will appear clear that optical fibers of configurations such as oval, rectangular, or other geometric shapes may be satisfactorily used in the embodiments of the present invention.

In the optical fiber sensors of the present invention, the optical fiber when embedded in the elastic material undergoes an initial deformation such as caused by the curing of cementitious material or the elastomeric material or by the normal strain present in muscles or organs of animals. With this initial deformation present in the optical fibers, a change in the initial deformation such as caused by deterioration of the elastic material as in the case of aggregate break-up, degradation of the elastomeric material, or atrophy or growth in animal muscle and organ changes the amount of the light being transmitted through the optical fiber with this change in light transmission being in accordance with the amount of deterioration or attrition taking place in the elastic material so as to provide an accurate measurement as to the extent to deterioration or attrition. These measurements of attrition are readily distinguished from changes in light transmission provided by dynamic loadings since in the latter case relatively sharp decreases in light transmission occurs.

With reference to the accompanying drawings, the embodiment of the invention illustrated in FIGS. 1–6 is directed to fiber optic sensors of elastomeric materials as described above for detecting, measuring and monitoring the formation of crack propagation, the break-up of aggregate, or other forms of deterioration or attrition occurring in structures formed of cementitious materials such as concrete, mortar, and grout. However, it will appear clear that other aggregate materials such as asphalt may be similarly provided with the fiber optic sensors for substantially the same purposes.

In engineering structures of concrete as used in the construction of highways, bridges, building foundations and other load-bearing applications, the concrete commonly undergoes a significant amount of deterioration or attrition which leads to diminished capabilities and possibly catastrophic failure of the concrete structure. The formation of cracks, joint misalignment, break-up of the aggregate, in the concrete structure are usual causes of concrete attrition or deterioration with such attrition being significantly accelerated by the application of dynamic loads. Concrete and other cementitious materials are relatively elastic and are compressed upon the application of dynamic loading with some rebounding of the cementitious material occurring after each dynamic load to provide some restoration of the original shape. The extent of compression and rebounding varies with the applied load. For example, it has been found when using the optical fiber sensors of the present invention that each time a concrete slab was placed under a dynamic load its thickness and elasticity was permanently reduced so as to effectively change or alter the light transmission through the optical fibers. This permanent reduction in elasticity and thickness is reflected in the behavior of the optical fiber sensors whereby the light transmission through the optical fibers is subject to a permanent light transmission loss after each application of a dynamic loading, as will be described in further detail below. The application of relatively large dynamic loadings rapidly reduces the elasticity of the concrete, leading to crack formation and the break-up of the aggregate and also causes some misalignment joint regions of adjacent concrete slabs when different loadings are applied to the slabs. In addition to dynamic loadings, other commonly encountered attrition-producing conditions such as aging and temperature cycling are also responsible for the formation of cracks and other forms of concrete attrition and are readily monitored by the optical fiber sensors of the present invention.

As illustrated in FIG. 1, a concrete slab 10 of a rectangular configuration is provided with two generally parallel, longitudinally extending optical fibers 12 and 14 of the desired elastomeric material. While this concrete slab 10 is shown of a general rectangular configuration with two longitudinally extending optical fibers 12 and 14 disposed in a generally common horizontal plane, it will appear clear that the concrete slab can be of any suitable shape and that any number of optical fibers ranging from one optical fiber to several optical fibers per concrete structure may be utilized. Also, as will be described below an X-Y arrangement of optical fibers may be utilized in the concrete structure for more accurately monitoring the various events and the locations thereof occurring in the concrete structure. The optical fibers 12 and 14 with the core 16 and cladding 18 formed of the elastomeric material, preferably silicone rubber, are placed in the fresh concrete in a desired location and orientation as the concrete mixture is poured in a mold or form of a desired configuration. Preferably, the optical fibers are so oriented they normally traverse planes in the concrete slab that are oriented substantially perpendicular to the planes in which cracks normally occur so as to assure the optical fiber sensor will be contacted by cracks during formation thereof and thereby provide an accurate determination of the presence of cracking. Also, the fibers are preferably oriented at slight angles to one another, with or without crossovers, so as to determine direction of crack movement in a manner more effectively than by using parallel fibers. The optical fibers 12 and 14 are respectively coupled to light sources 20 and 22 such as light emitting diodes (LED's) which transmit light through the optical fibers. This transmitted light is received at the opposite end of each optical fiber by the light receivers 24 and 26, each formed of a photodiode or the like. While the optical fibers 12 and 14 are shown with the light sources and light receivers positioned at the opposite ends thereof, it will appear clear that a suitable reflector may be placed at the end of each optical fiber remote to the light source so that the light source and light receiver can be positioned at a common end of the optical fiber and thereby facilitate the placement of the optical fibers in relatively large or complex-shaped concrete structures. As shown in FIG. 1, the light sources 20 and 22 are coupled to a power supply and signal processor 28 through a single lead 30 while the light receivers 24 and 26 are individually coupled to the power supply and signal processor 28 through leads 32 and 34. The use of the separate leads 32 and 34 for the light receivers is needed for providing separate signals through each optical fiber for the monitoring and detecting of the location of the events occurring in the concrete slab 10.

The power supply and signal processor 28 uses a conventional circuit such as used in optical fiber-sensing instrumentation and as described in the aforementioned patents or the commonly assigned patent application. Such signal processing circuitry usually includes an analog-to-digital signal converting circuit coupled to a microprocessor or the like through which the digital signals are translated into useful data. Also, the power supply and the signal processor may be separately packaged or contained in the same package and placed near the concrete slab being monitored or positioned at a remote location with the signals from the processor being transmitted to a suitable receiver by wire or radio signals. The particular power supply and signal processing circuit employed does not form part of the present invention, thus, for the purpose of this description, the power supply and signal processor used with the fiber optic sensing systems of the present invention can be of any suitable type and utilized with any of the embodiments of the invention as will be described below.

As described above an initial deformation of the optical fibers occurs during the curing of the concrete which alters the effective diameter, length or orientation and which results in some light transmission loss. With this initial deformation in the optical fibers present, the signal processing circuit is adjusted so as to provide the fibers with a normalized signal from the deformed optical fibers. Thus, any changes in the concrete which may occur during loading or attrition, the initial deformation of the fiber is altered so as to result in a loss or increase in light transmission so as to give a reading indicative of the event occurring within the concrete. For example, with the optical fiber contained in the concrete slab which is undergoing attrition due to break-up of the aggregate, the initial loading on the optical fiber will be decreased so as to result in an increase in light transmission. Alternatively, when a dynamic loading, a decrease in thickness, a crack, or joint misalignment occurs in the concrete, the optical fibers will undergo further deformation from its initial deformation so as to result in a decrease in light transmission. Thus, by monitoring the increase or decrease in light transmission the attrition or loadings such as caused by a crack, bending motion, compression, or the like of cementitious body may be readily measured and monitored. As generally illustrated in FIG. 1, a crack 36 is shown propagating across the optical fiber 12 which is subject to a strain at the crack as the optical fiber is stretched across the crack without breakage so as to decrease the effective diameter to the optical fiber 12 and thereby decrease the amount of light transmission therethrough. As the crack 36 widens, the transmission loss is increased to indicate the width of the crack 36. The utilization of the elastomeric materials in the optical fiber sensor is essential to such crack monitoring since fibers formed of glass or other relatively inelastic types of materials would not be capable of this stretching function and would fracture at the point of the crack, especially as the crack widens.

Figure 2:
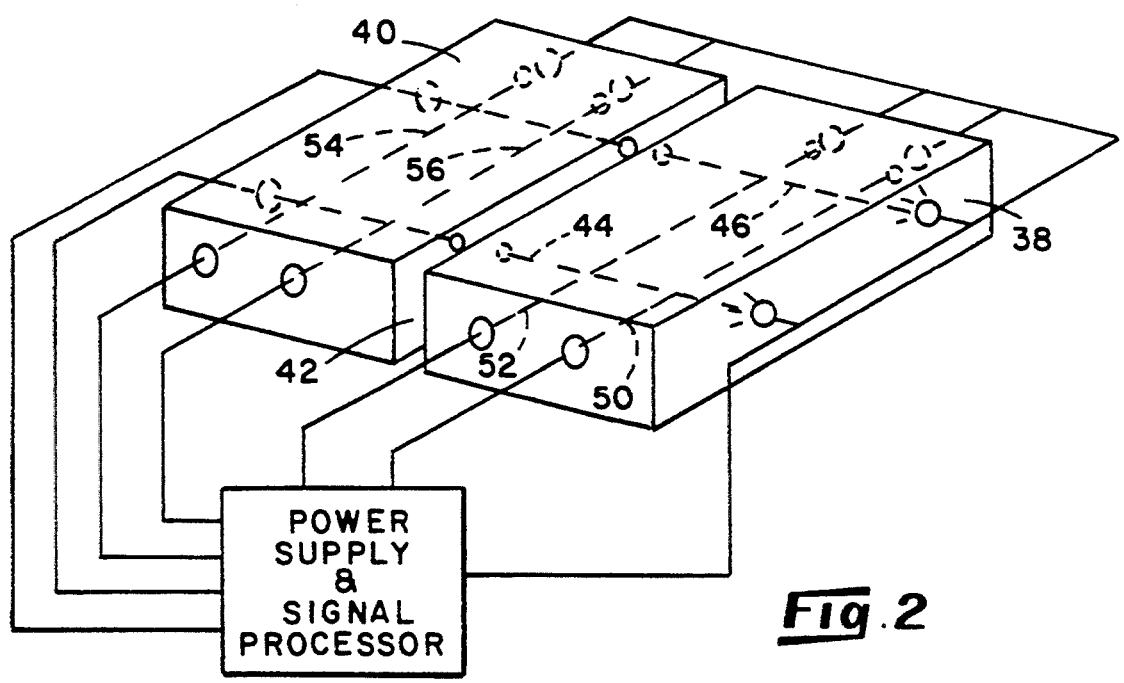
FIG. 2 illustrates an array of optical fibers positioned in adjacent concrete slabs for detecting relative movement of the slabs as well as events occurring in the individual slabs.

FIG. 2 illustrates a further arrangement of the fiber optical sensors employed in a concrete body wherein two slabs of concrete 38 and 40 are provided with a joint 42 therebetween as commonly practiced in the construction of bridges, highways, and the like. With this arrangement, relative displacement of the concrete slabs 38 and 40 with respect to one another at the joint 42, as often occurs in a bridge or other concrete structure, is accurately measured. The fiber optical sensors 44 and 46 are shown as being common to both slabs 38 and 40 and are disposed in a parallel spaced apart relationship to one another with these fiber optic sensors extending across the joint 42. FIG. 2 also shows optical fibers 50 and 52 contained in slab 38 and optical fibers 54 and 56 in the concrete slab 40 for the monitoring of cracks and dynamic loads and the like occurring in the individual slabs 38 and 40 as in the FIG. 1 embodiment.

Figure 3:
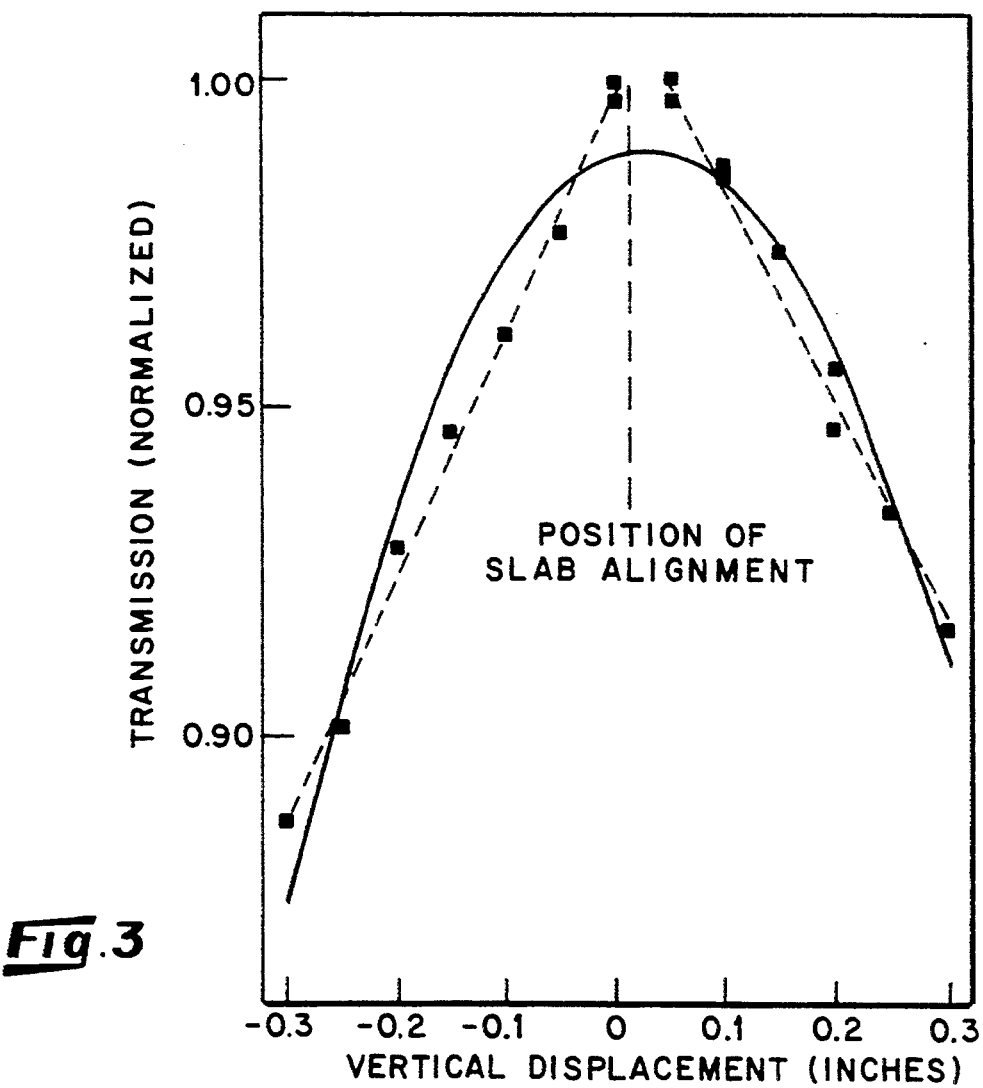
FIG. 3 is a graph illustrating the sensor output indicative of relative displacement of the two concrete slabs in FIG. 2.

In FIG. 3, the light transmission through each of the optical fibers 44 and 46 spanning the joint 42 is at maximum level when the slabs 38 and 40 are in their initial alignment. When one slab is vertically displaced with respect to the other slab, the light transmission through the optical fibers 44 and 46 is substantially decreased so as to show the extent of joint misalignment or displacement occurring between the concrete slabs 38 and 40. Also, by using the X-Y arrangement of the optical fibers as generally shown in FIG. 2, the location of cracks as well as the application of dynamic loadings can be more accurately determined than with the optical fibers oriented in only the X or the Y direction.

Figure 4:
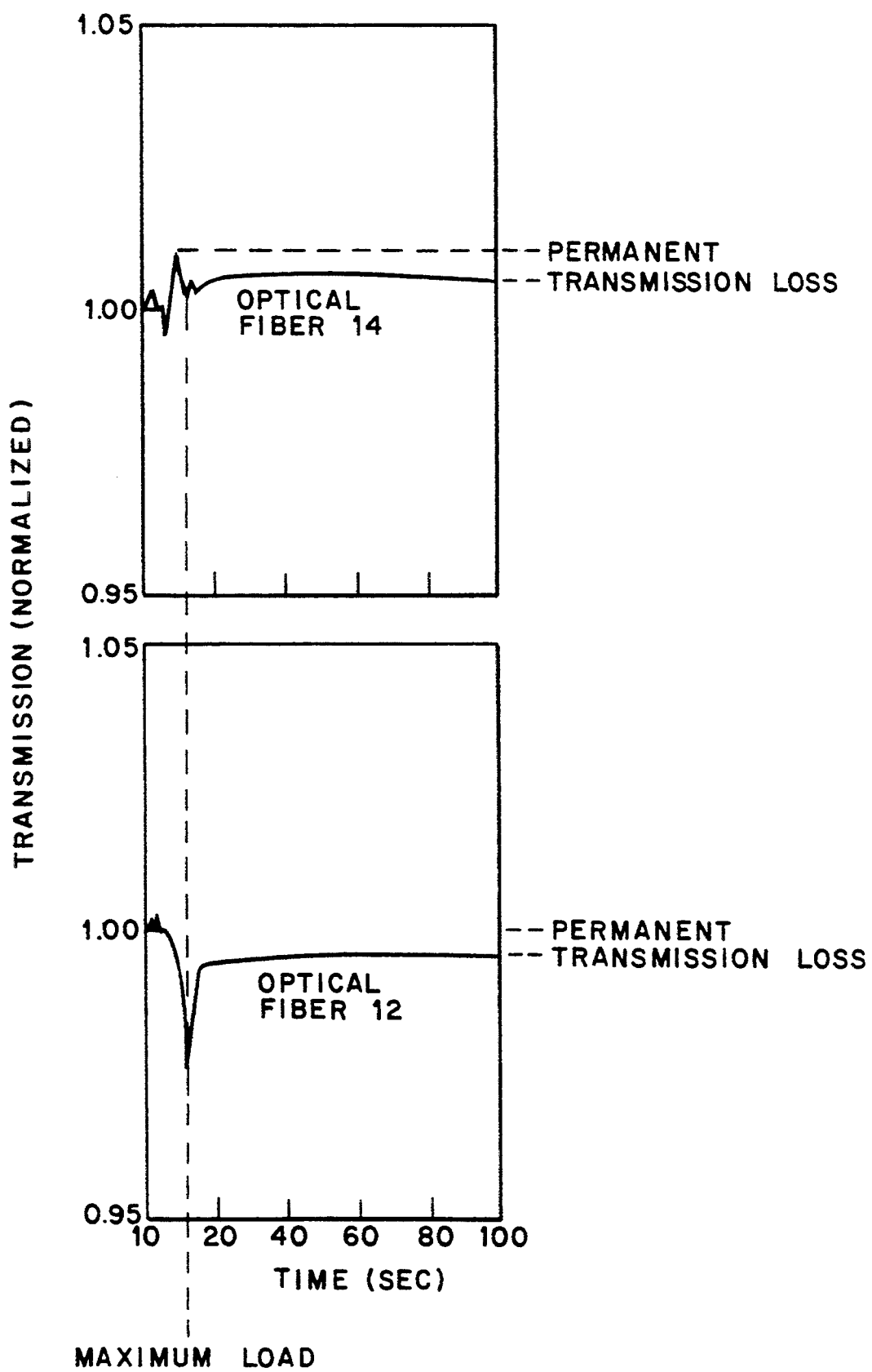
FIG. 4 is two graphs respectively illustrating light transmission loss and permanent loss of elasticity in a single cracked concrete slab as in FIG. 1 with the existence of the crack being indicated at the maximum load.
Figure 5:
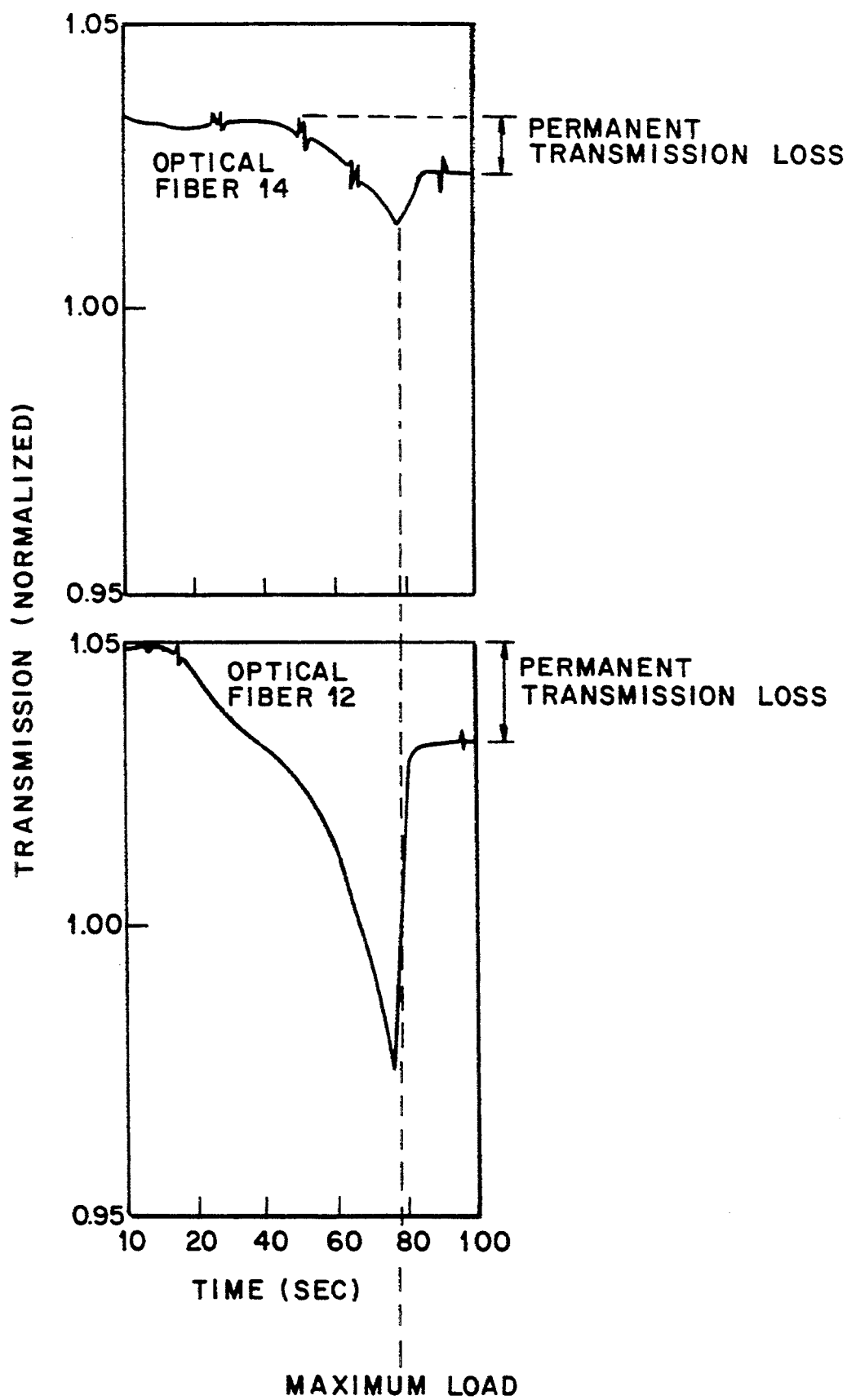
FIG. 5 is two graphs similar to that of FIG. 4 but showing the response of the cracked concrete slab to a second loading.

In a demonstration of the optical fiber sensors of the present invention, two optical fibers as in the FIG. 1 embodiment are embedded in a concrete slab having dimensions approximately 9 inches in length by 9 inches in width and of a 3 inch thickness. The concrete slab is subjected to a maximum loading of 409 lbs per square inch under several loading conditions with the first load being applied at 0.05 inch/minute. As the first load is applied to the concrete slab, a crack was formed in the slab as indicated in the graph of FIG. 4 by the sharp deflection in the curve at the maximum load line. As shown in this graph, this crack is more prevalent at the optical fiber 12 than at optical fiber 14 since the optical fiber 12 was located at a location closer to the crack with its zero point being shifted at the instant the crack appeared while at optical fiber 14 the significant decrease in light transmission was primarily due to the compressive loading on the slab. However, as indicated in this graph, both optical fiber sensors experienced a permanent light transmission loss due to the decreased thickness and elasticity of the concrete slab as produced by the dynamic loading. When the concrete slab was subjected to even a larger compressive load of 1700 lbs per square inch as shown in FIG. 5, with the crack already present in the concrete slab, both optical fibers indicated similar behavior with the optical fiber 12 indicating the greater amount of transmission loss at the maximum load line due to the greatest deflection or the stretching of the fiber at the point of the crack. By using an optical sensor arrangement such as illustrated in FIG. 1, the dimensions of the crack and its general location as well as the amount of loading present on a concrete slab with or without a crack, may be readily determined.

Figure 6:
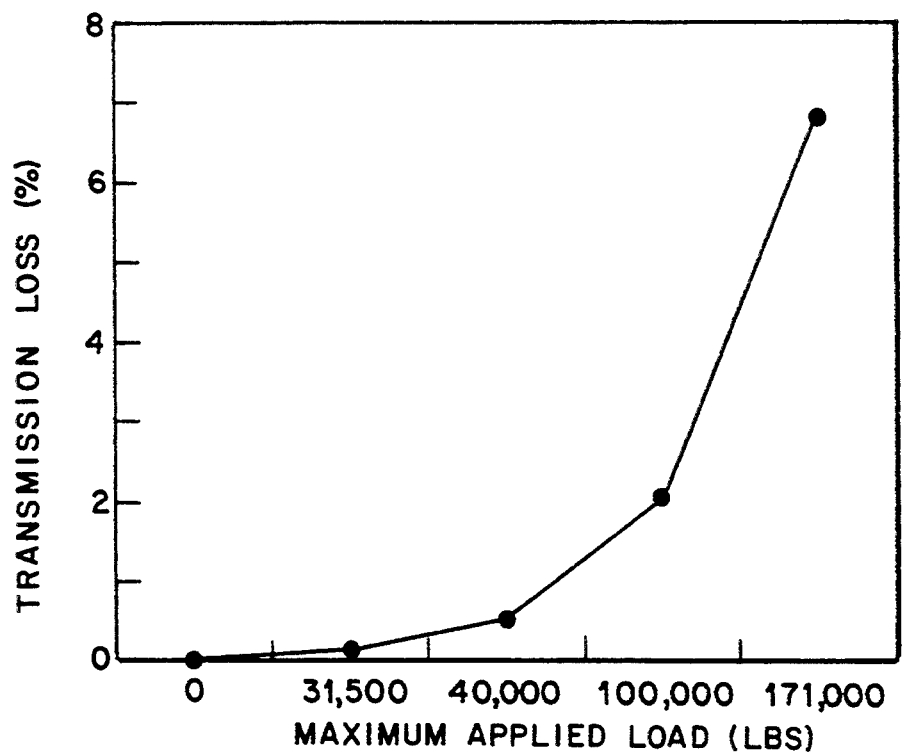
FIG. 6 is a graph illustrating the light transmission loss occurring in a concrete slab subjected to dynamic loads of various weights.

The maximum load applied directly to a concrete slab containing an optical fiber sensor provides a transmission loss in the optical fiber which is dependent upon the load being applied to the concrete slab. As illustrated in FIG. 6, the light transmission loss is shown to substantially increase from a total loading of about 31,500 lbs on a 6 in × 6 in surface up to about 100,000 lbs and then is sharply increased up to the maximum load of 171,000 lbs. This change in transmission loss is indicative of the permanent deformation occurring in the concrete slab due to the application of this type of loads. With such loads, especially at the larger loadings, the deterioration and attrition of the concrete is significantly accelerated so as to cause a deleterious failure of the concrete structure at a rate which may be unexpected. Thus, the optical fiber sensors of the present invention provide a valuable tool for monitoring the useful life of concrete structures.

Figure 7:
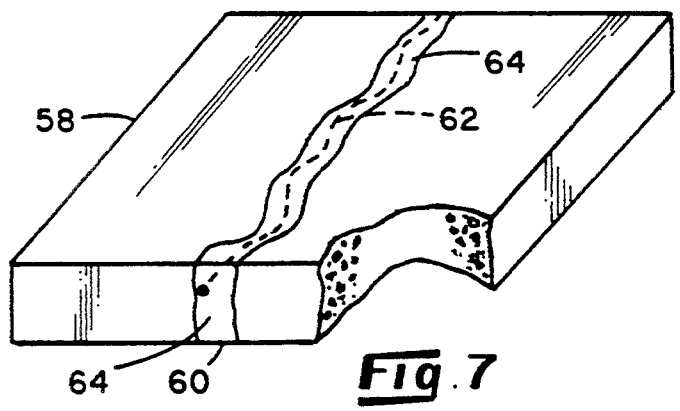
FIGS. 7 and 8 are concrete specimens employing a crack movement detector arrangement of the present invention.
Figure 9:
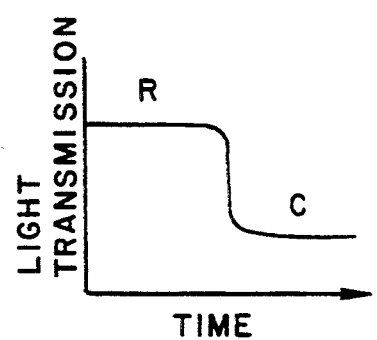
FIG. 9 is a graph illustrating the amount of light transmission loss occurring when the concrete is in a relaxed condition as in FIG. 7 versus a compressed condition as in FIG. 8.
Figure 8:
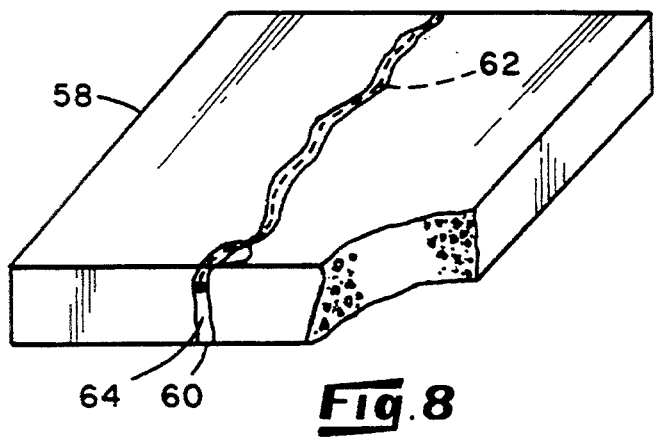

A further embodiment of fiber optical sensor is illustrated in FIGS. 7-9. In this embodiment a concrete slab 58 is shown containing a crack 60 but is also applicable to a joint between two individual concrete slabs such as in the FIG. 2 embodiment. An optical fiber 62 is shown positioned in the crack 60 with the optical fiber 62 generally conforming to the tortuous path defined by the crack 60. The crack 60 is then filled with a filler 64 of a material such as a silicone rubber or a petroleum-based substance such as tar or the like as normally used for filling cracks in concrete structures so as to embed the optical fiber within the concrete structure and securely attach the optical fiber to the concrete so that movement in the concrete such as caused by expansion or contraction of the concrete deforms the optical fiber 62. For example, in FIG. 7 the optical fiber 62 is shown in a relaxed state under an initial deformation but when, the concrete expands as shown in FIG. 8 the sides of the crack are moved toward one another so as to deform the optical fiber 62 and produce a loss in light transmission as shown in the graph in FIG. 9 between the upper horizontal line "R" and the lower horizontal line "C". This amount of light transmission loss in the cracked concrete slab is indicative of movement occurring therein such as caused by variations in temperature as well as displacement caused by deterioration of the concrete structure.

Figure 10:
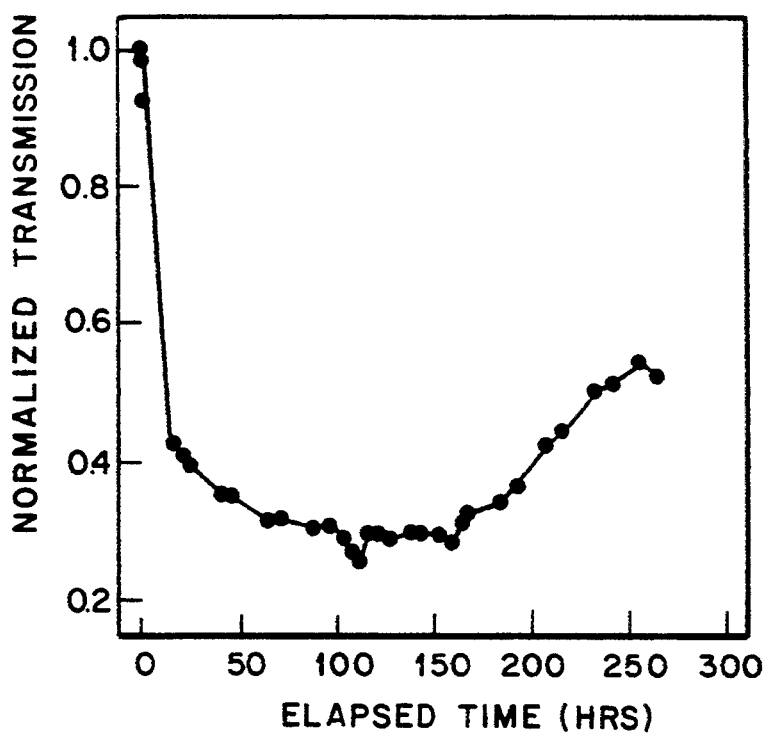
FIG. 10 and 11 are directed to a further embodiment of the present invention in which the maturation of concrete is shown to be a direct function of moisture content with the curing of the concrete being monitored by the optical fiber sensor of the present invention.
Figure 11:
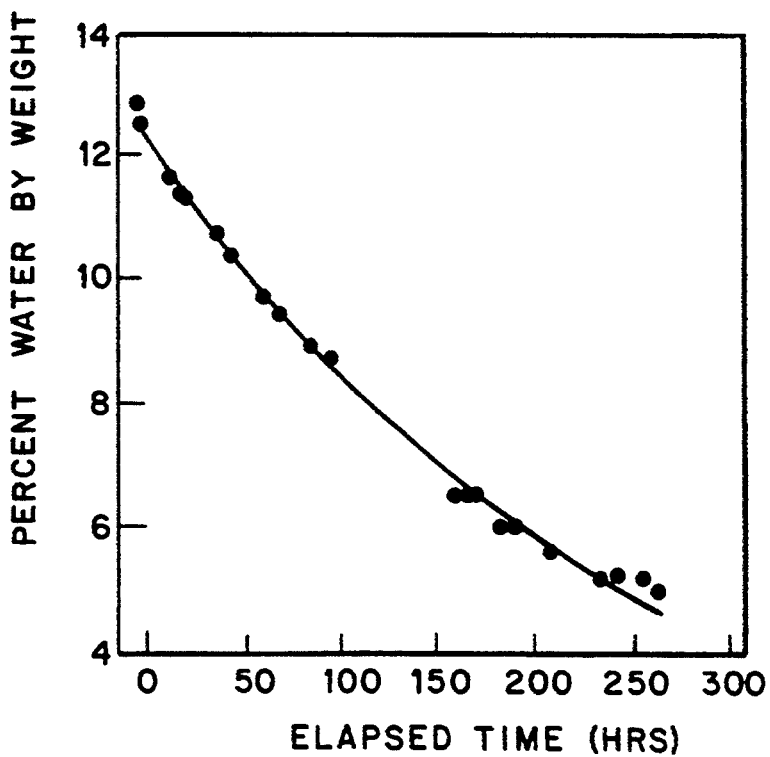

FIGS. 10 and 11 are directed to a further embodiment of the present invention which pertains to the monitoring and measuring of the maturation or curing of cementitious mixtures with this measurement of maturation shown provided in concrete starting when it is in a freshly poured stage containing a considerable concentration of water to a cured or mature stage where the concentration of the water in the concrete is significantly reduced due to evaporation and the chemical reaction occurring between the cement and water and other solids in the mixture. The curing or maturation of freshly poured concrete is a time dependent function of temperature and moisture content and is useful for monitoring the moisture content during the curing of the concrete so that steps may be taken based upon such measurements to assure that the desired properties of the concrete such as strength and durability will develop while minimizing cracking and shrinkage problems. While cracks and shrinkage may be visible at exposed regions of the concrete such events may not be observable if the crack or shrinkage occurs in the cementitious mixture in regions encased in a form or mold. The particular rate at which the moisture evaporates or is removed by the chemical reaction from the cementitious mixture depends upon the amount of water initially present in the mixture, the ambient temperature, humidity, and various other environmental factors such as wind. In this embodiment a sensor arrangement such as shown in FIG. 1 may be used. As shown in FIGS. 10 and 11 with the transmission of light through the optical fibers normalized to account for the deformation of the optical fibers in the fresh concrete, the light transmission undergoes a significant and relatively rapid loss as the moisture in the concrete mix permeates the elastomeric material, especially silicone rubber, used in the core and cladding of the optical fiber. As shown by the graph in FIG. 10, the water content decreases with respect to time so that as the cure continues in the light transmission it increases up to about 50% of the initial transmission which is indicative of achieving maturity. Another advantage of using the optical fibers especially those formed of silicone rubber in the cementitious structures of embodiments in FIGS. 1-11, is that the penetration of moisture into a concrete structure as caused by the initiation of crack will provide a signal indicative of the starting of a crack in the concrete at a time prior to the deformation of the optical fiber as provided by the stretching of the optical fiber across the crack as it increases in width. The penetration of moisture into the crack is direct indication of the existence of cracks in the concrete and will provide an early indication of a potential problem in a concrete structure.

The electronics in the processor used for converting light energy to electrical energy are preferably compensated for ambient temperature and voltage variations during the measurement of maturation in cementitious materials to assure that the data output from the processor accurately reflects the maturation of the cementitious material without being adversely affected by changes in ambient temperature and voltage variations from the power supply. Any suitable temperature compensating circuit such as the one used in the optoelectronics circuit in the aforementioned commonly assigned patent application may be utilized with the fiber optic sensors of the present invention for providing temperature compensated light output at the LED's during the measurement of maturation in cementitious materials. Variations in voltage output from the power supply which affect the light output at the LED's may be compensated for by using a conventional light detecting circuit for sampling the light output at the LED's and providing a signal to the processor circuitry that is used therein for stabilizing the voltage output from the power supply.

Figure 12:
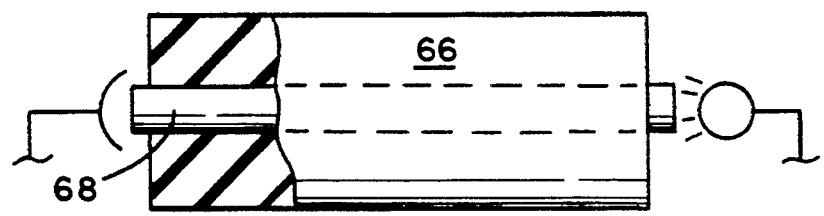
FIG. 12 is illustrative of another embodiment of the present invention wherein an elongated optical fiber sensor is employed in a body of elastomeric material such as synthetic rubber for monitoring and measuring loadings imposed thereon as well as attrition of the elastomeric material.
Figure 13:
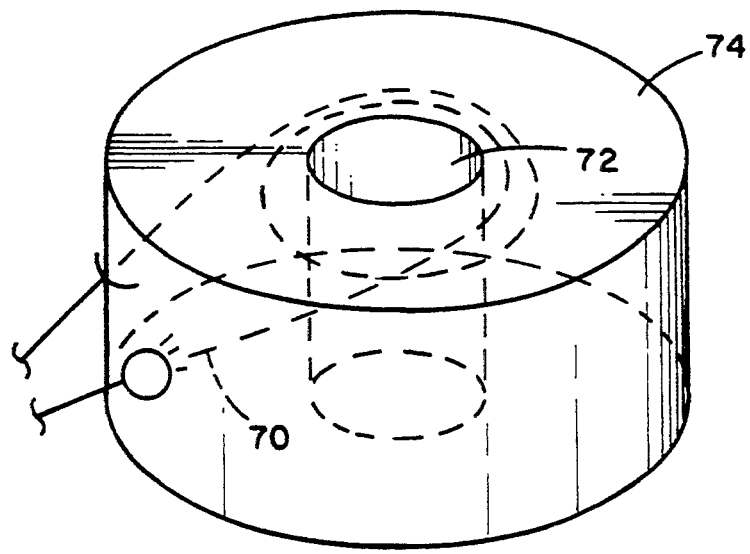
FIG. 13 is a further variation of the FIG. 12 embodiment showing the optical fiber sensor in a coiled configuration.

With reference to the embodiments of FIGS. 12-16, the optical fiber sensor is employed in elastomeric materials possessing elastic properties such as found in various rubbers and to a lesser extent polymers such as polyurethane, polyethylene, polytetrafluoroethylene, silicone, or in cellular forms of such materials as commonly used in applications requiring a material possessing such elastic properties. For example, in the automotive and aircraft industries elastic materials, particularly synthetic rubbers, are used in suspension systems, recoil systems, seals, gaskets, force indicators, springs, and damping systems. Polytetrafluoroethylene, because of its self-lubricating properties, is often used in various friction application such as bearings. It has been found that one of the main drawbacks to the use of elastomeric materials in such applications is that the elastomeric materials are subject to deterioration or attrition with age, and with such attrition being significantly increased when these materials are subjected to strain and bending loads, especially loads in excess of design specifications. In the embodiments of FIG. 12 and 13, one or more optical fibers are suitably embedded in the elastomeric material for monitoring and measuring the loadings applied to the elastomeric material whether such load is a compressive, bending or tension loading, the frequency of such loadings, and the measurement of deterioration of the elastomeric material such as due to the presence of cracking, loss of elasticity, or other forms of deterioration. This in situ monitoring and measurement of these various events occurring on elastomeric materials is achieved by embedding one or more optical fibers in a body of elastomeric material in a selected pattern such as illustrated in FIGS. 12 and 13. For example, in FIG. 12 the elastomeric material 66 contains an elastomeric optical fiber 68 disposed in a generally longitudinally extending orientation through the central portion of the body of elastomeric material 66 whereas in FIG. 13 the optical fiber 70 is positioned in a circular or spiral orientation about a central bore through the body of elastomeric material 74. The particular orientation of the optical fiber within the body of elastomeric material is primarily dependent upon which type of forces that are to be measured. For example, if the material is subjected to bending modes or stretching modes then the embodiment of FIG. 12 would be appropriate, but with compressive forces acting upon elastomeric material disposed about a central core then the embodiment of FIG. 13 would be more suitable. These optical fibers are easily embedded in any elastomeric material having a curing temperature less than that of the particular elastomeric material used in the formation of the optical fibers. For example, the use of optical fibers of silicone rubber, which has a melting temperature of about 275° F., permits the use of such optical fibers in a significant number of synthetic rubbers and polymers formed at temperatures less than 275° F.

Figure 14:
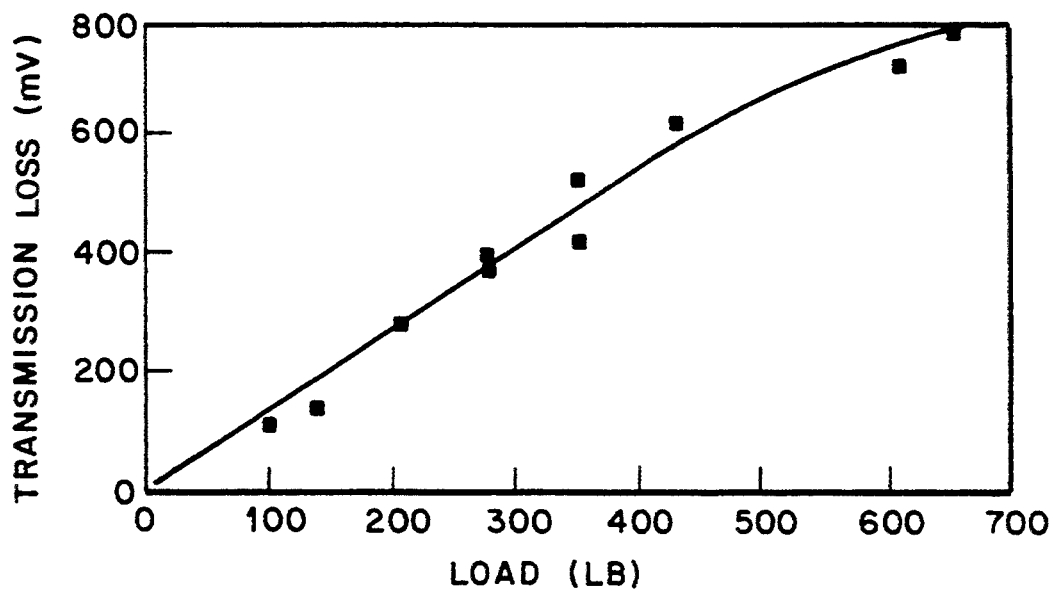
FIG. 14 is a graph illustrating the light transmission loss of the optical fiber sensor of FIG. 13 when subjected to various dynamic loads.
Figure 15:
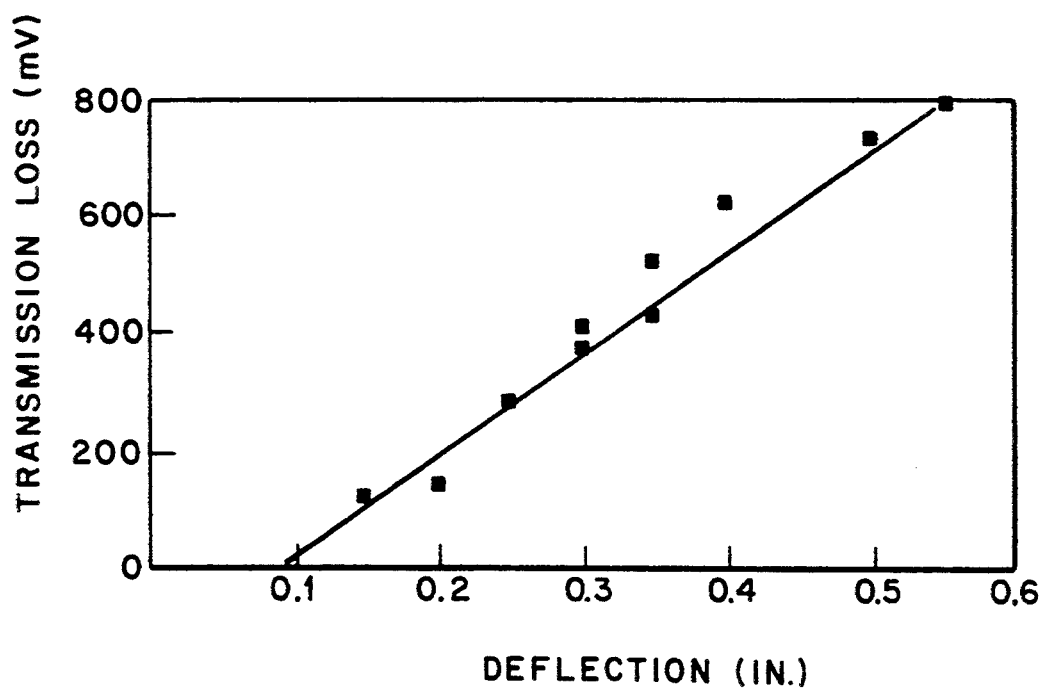
FIG. 15 is a graph illustrative of the light transmission loss versus specimen deflection in the FIG. 13 construction when subjected to various loadings.

The embedded optical fibers are subjected to an initial deformation during the curing of the elastomeric material to cause some light transmission loss or light attenuation through the optical fibers so as to require that the light transmission be normalized to a selected value for use in monitoring the changes in light attenuation brought on by various dynamic loadings imposed upon the elastomeric material and/or the deterioration or attrition thereof. FIGS. 14 and 15 are illustrative of the output of the optical fiber sensor with respect to light transmission loss with dynamic loadings. As shown in FIG. 14, increases in the intensity of a dynamic load produce significant increases in attenuation of the light transmission loss in the optical fiber. FIG. 15 shows that as the deflection of the rubber specimen is increased, the light transmission loss is significantly increased.

Figure 16:
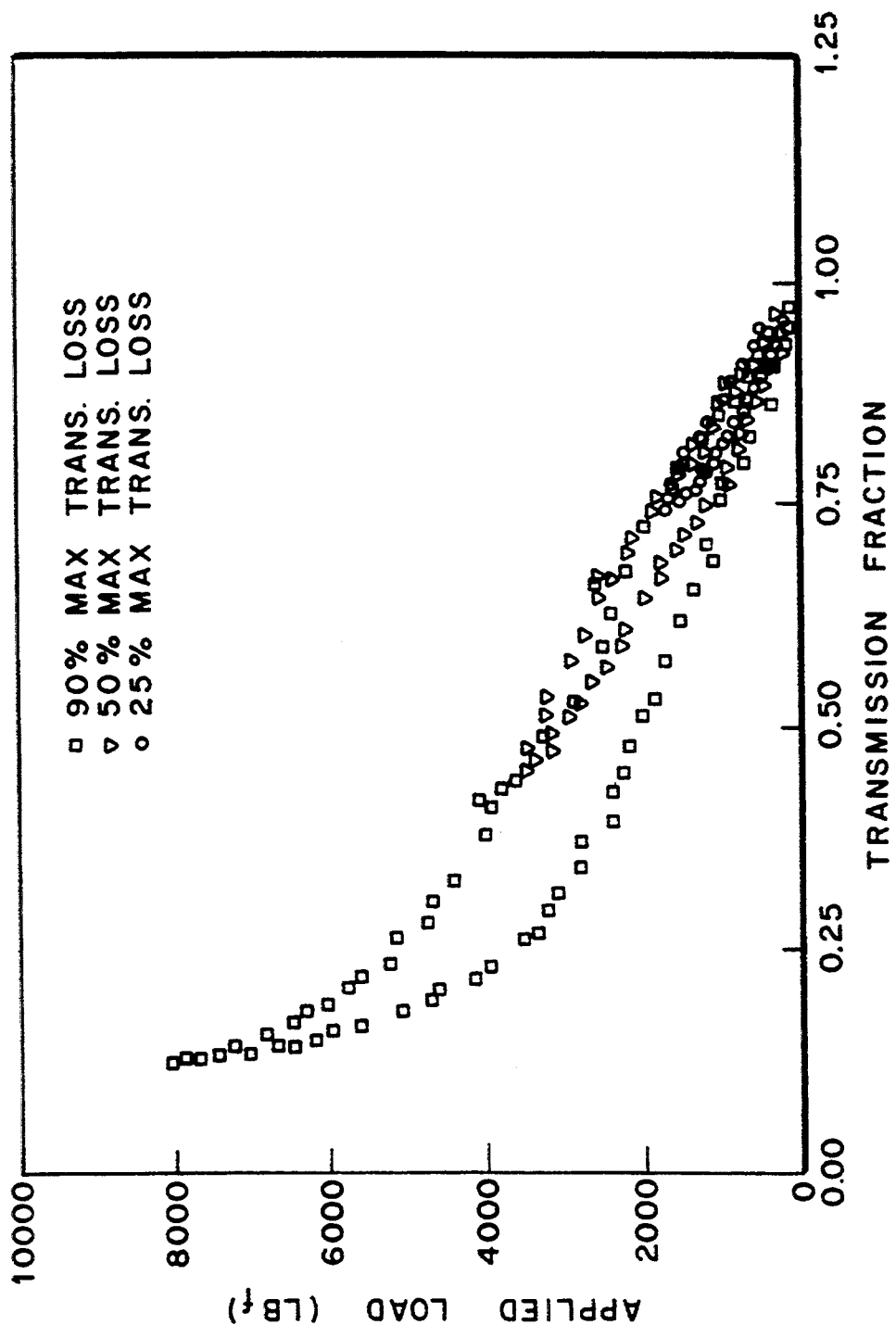
FIG. 16 is a graph illustrating the responses of the optical fiber sensor of FIG. 13 under compression loadings sufficient to compress the optical fiber for providing 25%, 50%, and 90% light transmission losses therethrough, based upon a constant two-second pulse width, and with these curves further illustrating the hysteresis occurring after each dynamic loading.

FIG. 16 is illustrative of the events occurring in a polyethylene body containing a single longitudinally extending optical fiber, such as illustrated in FIG. 12, and provides a comparison of response by the optical fiber when the polyethylene body is sufficiently compressed to cause light transmission losses of, 25%, 50%, and 90% in the optical fiber based on a constant two-second pulse. As shown, there is a significant amount of hysteresis or rebounding occurring in the polyethylene body as the load is removed therefrom with the amount of hysteresis occurring increasing with increasing loads. Also, with sequentially applied loadings, the increase in the amount of hysteresis and the light transmission loss will be indicative of the reduction in elasticity of the elastomeric component.

With reference to the embodiment of the present invention illustrated in FIGS. 17-20 which is directed to the embedding of one or more optical fibers of elastomeric material in the sole of a shoe as usually formed of an elastomeric material such as commonly utilized in shoes used in recreational and/or orthopedic rehabilitation purposes. The embedded optical fiber sensor provides a measure of impact or force the wearer is applying upon the sole and thus upon the body of the wearer during walking, exercise or rehabilitation regimens. Also, the embedded optical fiber sensor gives a measure of any deterioration occurring in the elastomeric material forming the sole so as to assure that adequate support and elasticity is provided by the sole to the wearer, especially in the hip, knee, and joint areas which could be undesirably stressed if insufficient elasticity is present in the sole to absorb shocks occurring during walking and especially running or rehabilitation exercises.

With respect to the embodiments shown in FIGS. 12–20 when the deterioration of the elastomeric material reaches a point where it loses its capability for adequate shock absorption a suitable visual or audio signal indicative of this condition may be provided by the processor. Also, in the case of the soles of shoes losing their capability of adequate shock absorption, a tickler-like impulse may be provided to the wearer.

Figure 20:
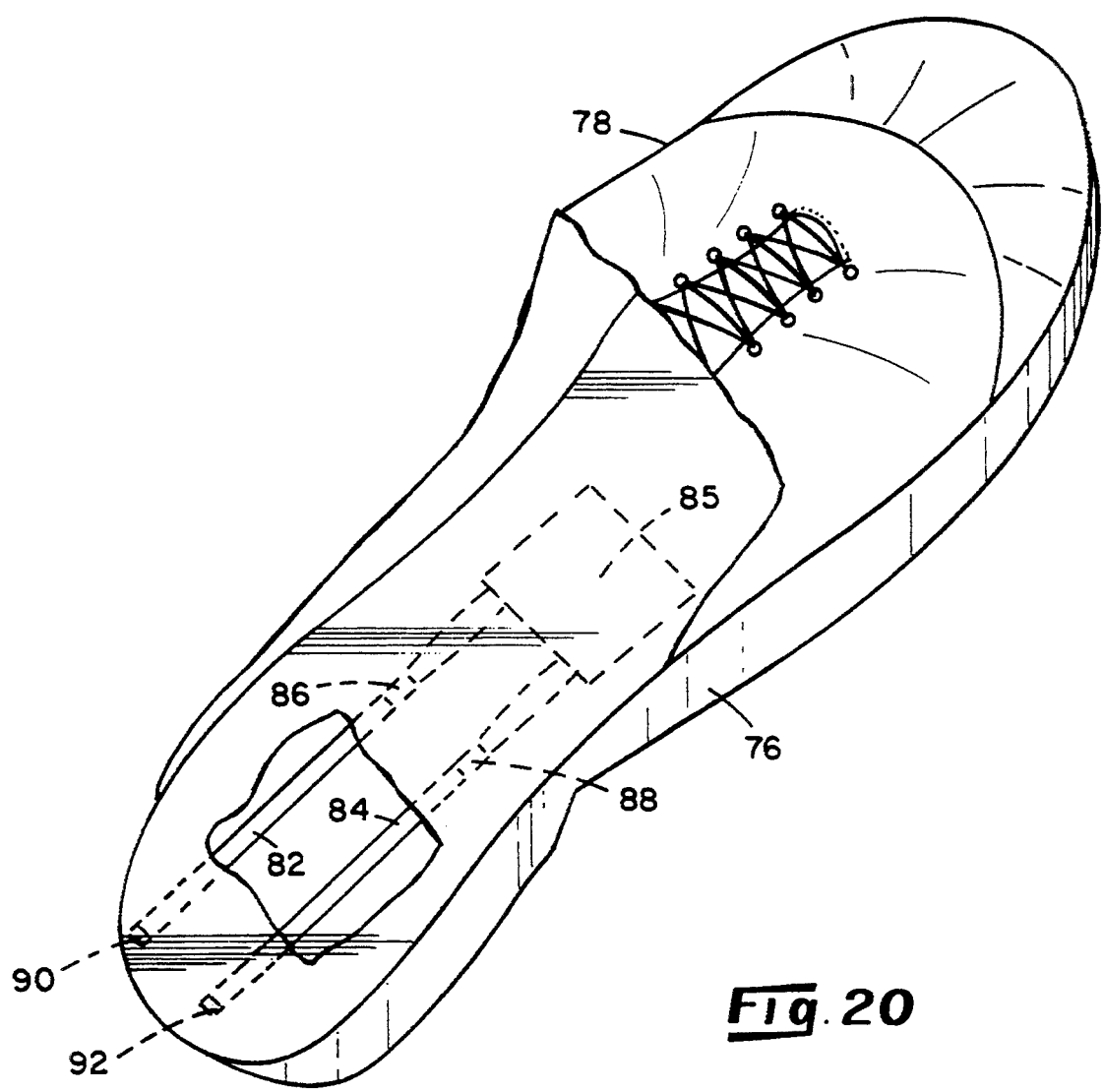
FIG. 20 is a schematic diagram showing the fiber optic sensors embedded in the shoe together with the power supply and signal processor.

As illustrated in FIG. 17 and 18, the sole 76 of a shoe 78 attached to a foot of a human being generally indicated at 80 is shown provided with a pair of embedded optical fibers of elastomeric material as generally shown at 82 and 84. In FIG. 20 the longitudinally extending optical fibers 82 and 84 are shown embedded in the heel region of the sole 76 in a spaced apart and parallel orientation with these fibers extending from a location near the rear of the shoe 78 towards and reaching approximately the arch region of the sole 76. The power supply and signal processor 85 is shown embedded in the arch region of the sole 76 so as to provide the shoe with an integral and complete fiber optic sensing system and thereby avoiding the use of cumbersome external wiring or circuitry. In this embodiment the light source such as an LED and the light receiver such as a photodiode or phototransistor for the optical fibers 82 and 84 are shown at 86 and 88, respectively, coupled to the optical fibers at one end thereof. In this embodiment each of the optical fibers 82 and 84 is provided with a suitable reflector such as generally shown at 90 and 92 at the end thereof remote to the light sources and light receivers 86 and 88. Of course, it is to be understood that the light receiver can be positioned at the end of each optical fiber opposite to the light source. Also, it is to be understood that while two generally parallel optical fibers are illustrated, a single optical fiber may be used with the optical fiber being embedded in a relatively straight orientation, a generally S-shaped configuration, or in a coiled or circular configuration. Further, while the optical fibers are shown embedded in the heel region of the shoe, it will appear clear that these optical fibers may be positioned in the sole under the ball of the foot or that the optical fibers may be located in the sole in both the heel region and the ball of the foot region with the power supply and processor located therebetween.

With particular reference to FIGS. 17–19, FIG. 17 shows the optical fibers in a substantially round configuration as would occur when the wearer is not applying a load on the optical fiber such as between steps so as to provide a level of light transmission indicative of such a "relaxed" state as shown by the letter R in FIG. 17. As the wearer exerts a force loading upon the heel region in the sole of the shoe as shown in FIG. 18, the optical fibers become compressed so as to significantly decrease the light transmission therethrough as indicated by the line C in FIG. 19. The amount of force applied to the heel region in the shoe is proportional to the amount of light transmission loss so as to provide an accurate measurement of the amount of stress being applied to the heel region of the wearer. This measurement is particularly advantageous for orthopedic rehabilitation purposes for providing measurements indicative of whether the wearer is over stressing the hip, knee, or ankle joints. In fact, the signal processor 85 may be provided with a suitable beeper, light from an LED or the like, a vibration pulse, or other mechanism which would emit an audio, video or other signal advising the wearer that the particular exercise regimen is, in fact, over stressing and should be reduced in intensity. The circuitry for the audible or other signal may be suitably adjusted so as to provide a signal indicative of the amount of stress tolerance desired for the wearer. The employment of the spaced apart optical fibers can also be used to provide a signal or data indicative of whether or not the wearer, especially in a running exercise, is pronating or supinating or if the feet are hitting the sole correctly. With the optical fiber sensors in both the heel region and in the ball of the foot region any changes in running or even walking patterns such as reflected by the different weight distributions imposed by the foot of the wearer in the heel and the ball of the foot regions may be readily detected, measured and monitored In the embodiment of FIGS. 21–25, optical fiber sensors are embedded within the body of an animal such as typical laboratory or research animal or in the body of a human being, as shown, for in-vivo diagnostic purposes such as for detecting and measuring pressure, displacement, strain, flexure, and atrophy or growth of muscle and organs. Also, such in-vivo diagnostics provided by this embodiment of the present invention include the monitoring and measuring for the development of deterioration of abnormal growths within an animal body such as tumors or the like which could not be otherwise accurately monitored and measured in a continuous manner by employing currently available instrumentation or techniques.

As briefly mentioned above, in this embodiment the core and cladding of the optical fibers are preferably formed of silicone rubber because of its well established compatibility and inertness with animal tissue. The illustrations in FIGS. 21 to 25 are merely exemplary of in-vivo applications of the optical fiber sensors of the present invention. In FIGS. 21 and 22, an optical fiber 100 of silicone rubber is shown embedded in the knee 102 of a human leg 104 with the optical fiber 100 spanning the knee joint and embedded in tissue common to the knee region for conjunctive movement therewith during flexure of the knee. In a normal or relaxed state of the knee 102, as generally shown in FIG. 21, the light transmission is a relatively full or normalized state as indicated by the line segment "R" in the graph of FIG. 23. However, when the knee 102 is bent or flexed as in FIG. 22, the optical fiber 100 is bent and stretched to deform the optical fiber and thereby attenuate the light transmission therethrough as indicated by the line segment "F" in FIG. 23. The amount of light attenuation is a function of the degree of knee flex and the strain imposed upon the muscles and tendons in the knee region that are contiguous to the optical fiber. This optical fiber sensor arrangement provides an important diagnostic tool that is particularly useful in orthopedic rehabilitation applications and could be suitably utilized in other joint regions of the body such as in the elbow, shoulder, hip and ankle.

Figure 24:
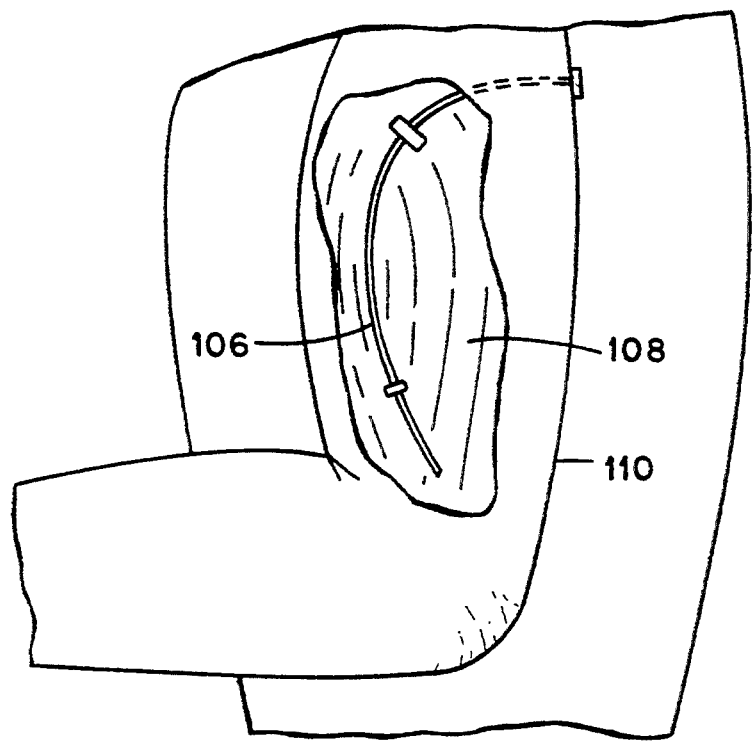
FIG. 24 is a further view of this embodiment wherein the fiber optical sensor is embedded in a bicep muscle of a human being for monitoring the activity and attrition, and/or development of the muscle.

FIG. 24 illustrates an optical fiber sensor 106 embedded in the bicep muscle 108 of a human arm 110. Flexure, atrophy, and growth of the muscle 108 can be readily detected, measured, and monitored by this embodiment. For example, upon the flexure of the muscle 108 the optical fiber 106 will undergo some bending as well as compression due to tightening of the muscle about the optical fiber 108 so as to give a measurement indicative of the strain applied in the bicep muscle. In the case of muscle attrition the amount of pressure applied by the muscle upon the optical fiber will provide for less light attenuation and thereby provide a measurement of such attrition due to an increase in light transmission over that provided by the embedded optical fiber under the influence of the initial deformation imposed thereon by the strain normally present in a relaxed muscle. Alternatively, if the initial deformation is increased to provide a steady state measurement indicative of some higher level of light transmission loss when the muscle is in a relaxed or normal condition a measurement would be provided showing that muscle development has occurred. Such development would be also indicated by a greater decrease in amount of light transmission during flexure of the muscle. It is to be understood that the optical fiber shown embedded in a bicep muscle can be suitably embedded in any muscle or tendon of the animal body for detecting, measuring, and monitoring the flexure of the muscle or tendon as well as atrophy and growth thereof.

Figure 25:
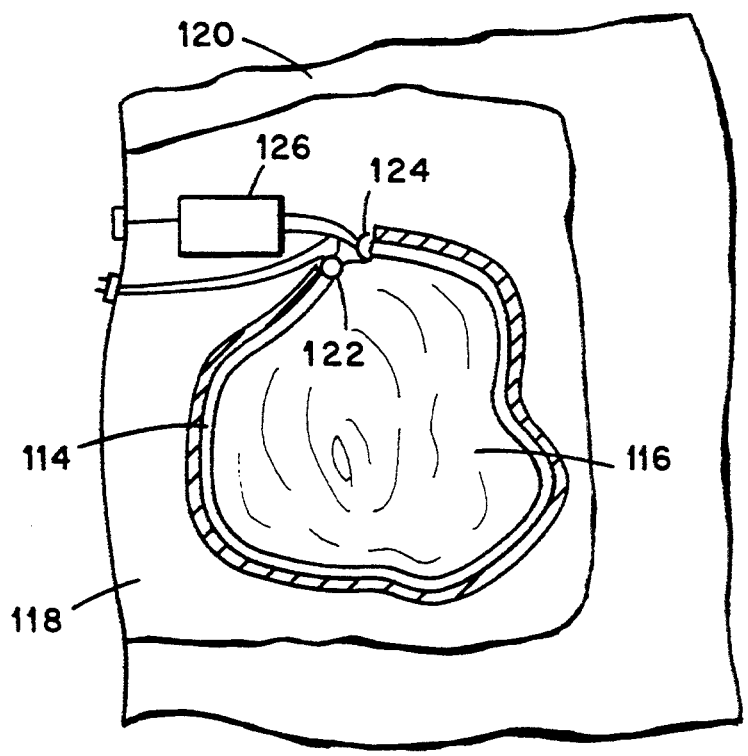
FIG. 25 is a schematic representation of a human torso generally showing a tumor in the stomach region thereof, with the optical fiber sensor embedded in peripheral regions of the tumor for monitoring tumor activity.

In the schematic illustration of FIG. 25, the optical fiber sensor 114 is shown attached to a tumor 116 contained within the stomach region 118 of a human torso 120. The optical fiber sensor 114 is shown substantially encircling the tumor 116 and is constrained therewith such as provided by the embedding of the optical fiber 114 within the surface region of the tumor 116 or by fixedly securing the optical fiber 114 to the surface of the tumor 116 by a surgical procedure so as to assure that any movement of the tumor 116 such as caused by growth or attrition would result in a corresponding conjunctive movement of the optical fiber 114 with the strain provided thereon providing a light transmission loss over that provided from the initial deformation of the optical fiber 114 which would be indicative of the tumor growth or a gain in light transmission which would be indicative of atrophy or attrition of the tumor. In the embodiments of FIGS. 21-25, the power supply and signal processor may be contained externally of the body and connected to the light transmitting means such as an LED and the light receiver such as a photodiode emplaced within the body in appropriate ends of the optical fiber such as generally shown in FIG. 25 at 122 and 124 or, if desired, the power supply and signal processor may be contained within the body such as shown in FIG. 25 at 126. Also, by emplacing a power supply and signal processor within the body, the patient can proceed with normal activities with the various signals indicative of the desired monitoring and measurements being recorded on a suitable recording mechanism contained in the processor for subsequent observations by a medical practitioner. It will be seen that the optical fiber sensors of the present invention provide a significant improvement over previously known systems for detecting, monitoring and measuring dynamic events occurring in elastic materials as well as providing a measurement indicative of the stage of degradation or deterioration of the elastic material.

What is claimed is:

1. An optical fiber sensor for measuring a dynamic loading applied to a body of elastic material, comprising a body of elastic material, elongated optical fiber means formed of a core and cladding of an elastomeric material sufficiently fixedly embedded within the body of elastic material for conjunctive displacement therewith so that any movement in internal regions of the body of elastic material contiguous to regions of the embedded optical fiber means upon the application of a dynamic loading to the body of elastic material deforms the optical fiber means at a location thereon corresponding to the location of the movement in said regions with the amount of the deformation substantially corresponding to the extent of movement in the body of elastic material in said regions, light producing means coupled to the embedded optical fiber means for transmitting light therethrough, and light receiving means coupled to the embedded optical fiber means for receiving light transmitted therethrough with the amount of light received thereby being proportional to the amount of deformation of the optical fiber means for providing a signal indicative of the extent of movement occurring in said regions of the body of elastic material and corresponding to a measure of the dynamic loading applied to the body of elastic material in said regions.

2. An optical fiber sensor for measuring a dynamic loading applied to a body of elastic material as claimed in claim 1, wherein the elastic material is a cementitious material, an elastomer, or an elastic component contained within the body of an animal.

3. An optical fiber sensor for measuring a dynamic loading applied to a body of elastic material as claimed in claim 2, wherein the elastomeric material forming at least one of the core and the cladding of the optical fiber means is silicone rubber.

4. An optical fiber sensor for measuring a dynamic loading applied to a body of elastic material as claimed in claim 2, wherein the body of elastic material is body of cementitious material having upper and lower surfaces, and wherein the elongated optical fiber means is embedded in the body of cementitious material at a location intermediate to said upper and lower surfaces and extends along a plane substantially parallel to at least one of said surfaces.

5. An optical fiber sensor for measuring a dynamic loading applied to a body of elastic material as claimed in claim 2, wherein the elastic material is a body of elastomeric material, and wherein the optical fiber means is embedded in the body of elastomeric material at a location therein subject to dynamic loadings applied to the body of elastomeric material and provided by at least one of a compression load, a tension load material, and a bending load.

6. An optical fiber sensor for measuring a dynamic loading applied to a body of elastic material as claimed in claim 2, wherein the body of elastic material is elastomeric material forming a sole of a shoe for receiving a foot of a human being with said sole having substantially parallel upper and lower surfaces and including a heel region an arch region and a ball of the foot region, wherein the optical fiber means is embedded in the sole at a location intermediate to the upper and lower surface and in at least one of the heel region and the ball of the foot region, and wherein the light transmitting means and the light receiving means are embedded in the sole.

7. An optical fiber sensor for measuring a dynamic loading applied to a body of elastic material as claimed in claim 2, wherein the elastic component within the body of a animal is a muscle, and wherein the elongated optical fiber means is embedded in the muscle at a location therein subject to dynamic loadings applied by the muscle as provided by at least one of a compression load, a tension load, and a bending load.

8. An optical fiber sensor for measuring attrition in a body of elastic material, comprising a body of elastic material, elongated optical fiber means formed of a core and cladding of an elastomeric material sufficiently fixedly embedded within the body of elastic material for conjunctive movement therewith and subjected to an initial amount of deformation so that any attrition in internal regions of the body of elastic material contiguous to regions of the embedded optical fiber means in the body of elastic material changes said initial amount of deformation in the optical fiber means at a location thereon corresponding to the location of the attrition in said regions of the body of elastic material with the amount of the change in the initial deformation substantially corresponding to the extent of attrition in the body of elastic material in said regions, light producing means coupled to the embedded optical fiber means for transmitting light therethrough, and light receiving means coupled to the embedded optical fiber means for receiving light transmitted therethrough with the amount of light received thereby being proportional to the amount of change in the initial deformation of the optical fiber means for providing a signal indicative of a measure of attrition occurring in said regions of the body of elastic material.

9. An optical fiber sensor for measuring the attrition of a body of elastic material as claimed in claim 8, wherein the elastic material is a cementitious material, an elastomer, or an elastic component contained within the body of an animal.

10. An optical fiber sensor for measuring the attrition of a body of elastic material as claimed in claim 9, wherein the elastomeric material forming at least one of the core and the cladding of the optical fiber means is silicone rubber.

11. An optical fiber sensor for measuring the attrition of a body of elastic material as claimed in claim 9, wherein the body of elastic material is body of cementitious material having upper and lower surfaces, and wherein the elongated optical fiber means is embedded in the body of cementitious material at a location intermediate to said upper and lower surfaces and extends along a plane substantially parallel to at least one of said surfaces.

12. An optical fiber sensor for measuring the attrition of a body of elastic material as claimed in claim 9, wherein the elastic material is a body of elastomeric material, and wherein the optical fiber means is embedded in the body of elastomeric material at a location therein subject to attrition.

13. An optical fiber sensor for measuring the attrition of a body of elastic material as claimed in claim 9, wherein the body of elastic material is elastomeric material forming a sole of a shoe for receiving a foot of a human being with said sole having substantially parallel upper and lower surfaces and including a heel region an arch region and a ball of the foot region, wherein the optical fiber means is embedded in the sole at a location intermediate to the upper and lower surface and in at least one of the heel region and the ball of the foot region, and wherein the light transmitting means and the light receiving means are embedded in the sole.

14. An optical fiber sensor for measuring the attrition of a body of elastic material as claimed in claim 9, wherein the elastic component in the body of an animal is a muscle, muscle or tendons in a joint region, or an organ, and wherein the elongated optical fiber means is embedded in the elastic component at a location therein subject to attrition.

15. An optical fiber sensor for measuring both attrition of and dynamic loadings applied to a body of elastic material, comprising a body of elastic material, elongated optical fiber means formed of a core and cladding of an elastomeric material sufficiently fixedly embedded and subjected to an initial amount of deformation within the body of elastic material so that any changes in the initial amount of deformation in the optical fiber means as caused by attrition of the body of elastic material or movement in internal regions of the body of elastic material contiguous to regions of the embedded optical fiber means upon the application of a dynamic loading to the body of elastic material alters the amount of amount of initial deformation according to whether the change is due to attrition or a dynamic loading applied on the optical fiber means at a location thereon corresponding to the location of the movement in said regions, light producing means coupled to the embedded optical fiber means for transmitting light therethrough, and light receiving means coupled to the embedded optical fiber means for receiving light transmitted therethrough with the amount of light received thereby being proportional to the amount of deformation of the optical fiber means for providing a signal indicative of the extent of movement occurring in said regions of the body of elastic material and corresponding to measures of the attrition of the elastic material in said regions and the dynamic loading applied to the body of elastic material in said regions.

16. An optical fiber sensor for measuring both the attrition of and the dynamic loadings applied to a body of elastic material as claimed in claim 15, wherein the elastic material a cementitious material, and elastomer or an elastic component contained within the body of an animal.

17. An optical fiber sensor for measuring both the attrition of and the dynamic loadings applied to a body of elastic material as claimed in claim 16, wherein the elastomeric material forming at least one of the core and the cladding of the optical fiber means is silicone rubber.

18. An optical fiber sensor for measuring both the attrition of and the dynamic loadings applied to a body of elastic material as claimed in claim 17, wherein the body of elastic material is body of cementitious material having upper and lower surfaces, and wherein the elongated optical fiber means is embedded in the body of cementitious material at a location intermediate to said upper and lower surfaces and extends along a plane substantially parallel to at least one of said surfaces.

19. An optical fiber sensor for measuring both the attrition of and the dynamic loadings applied to a body of elastic material as claimed in claim 17, wherein the body of elastic material is a body of elastomeric material, and wherein the optical fiber means is embedded in the body of elastomeric material at a location therein subject to dynamic loadings applied to the body of elastomeric material and provided by at least one of a compression load, a tension load, and a bending load.

20. An optical fiber sensor for measuring both the attrition and the dynamic loadings applied to a body of elastic material as claimed in claim 17, wherein the body of elastic material is elastomeric material forming a sole of a shoe for receiving a foot of a human being with said sole having substantially parallel upper and lower surfaces and including a heel region an arch region and a ball of the foot region, wherein the optical fiber means is embedded in the sole at a location intermediate to the upper and lower surface and in at least one of the heel region and the ball of the foot region, and wherein the light transmitting means and the light receiving means are embedded in the sole.

21. An optical fiber sensor for measuring both the attrition and the dynamic loadings applied to a body of elastic material as claimed in claim 20, wherein power supply means and signal processor means are embedded in the sole in substantially the arch region thereof and coupled to the light producing means and the light receiving means.

22. An optical fiber sensor for measuring both the attrition and the dynamic loading applied to a body of elastic material as claimed in claim 17, wherein the elastic component within the body of the animal is one of a muscle, a joint region, or an organ, and wherein the elongated optical fiber means is embedded in the elastic component at a location therein subject to at least one of attrition and dynamic loadings applied by the elastic component as provided by at least one of a compression load, a tension load, and a bending load.

23. An optical fiber sensor for measuring the curing rate of cementitious material comprising, an elongated optical fiber means formed of a core and cladding of an elastomeric material embedded within a body of freshly poured and uncured cementitious material containing a substantial amount of water, means for transmitting light through the embedded optical fiber means, and means for measuring the amount of light initially transmitted through the embedded optical fiber means with the amount of light attenuation being indicative of the amount of water present and with any changes in the amount of light subsequently transmitted through the embedded optical fiber means and with any change from the initial amount of light attenuation in the optical fiber means being indicative of extent of curing taking place in the cementitious material and with the rate of the change in the amount of light being transmitted through the optical fiber means being indicative of the rate of the curing taking place in the cementitious material.

24. An optical fiber sensor for measuring the curing rate of cementitious material as claimed in claim 23, wherein the means for transmitting light through the embedded optical fiber means include light emitting means and power supply means for providing an operating voltage thereto and wherein means are provided for compensating for variations in ambient temperature and variations in voltage at the light emitting means for providing a substantially constant voltage to the light emitting diode means.

25. (amended) An optical fiber sensor for measuring at least one of the attrition of, the cracking of, and a dynamic loading applied to a body of cementitious material having upper and lower surfaces, comprising a body of cementitious material, at least one elongated optical fiber means formed of a core and cladding of an elastomeric material fixedly embedded within the body of cementitious material at a location intermediate to said upper and lower surfaces with said optical fiber means extending along a plane substantially parallel to at least one of said surfaces and with an initial deformation imposed upon the optical fiber means, light transmitting means for transmitting light through the optical fiber means, means for receiving light transmitted through the optical fiber means, and means for measuring changes in light attenuation with changes in the amount of light attenuation being indicative of measurements of a crack developing in the body of cementitious material at a location spanned by the optical fiber means, the attrition of the cementitious material in locations contiguous to the optical fiber means, or a dynamic loading applied on the body of the cementitious material in a location contiguous to the optical fiber means.

26. An optical fiber sensor as claimed in claim 25, wherein said at least one optical fiber means is a plurality of elongated optical fiber means fixedly embedded in the body of cementitious material in a spaced apart substantially parallel relationship to one another, wherein the light transmitting means transmits light through each of the optical fiber means, and wherein the means for receiving the transmitted light and the means for measuring the light attenuation in each optical fiber means provide measurements substantially indicative of at least one of the location and length of a crack in the body of cementitious material, the location and amount of attrition in the body of cementitious material, and the general location of and the amount of the applied dynamic loading.

27. An optical fiber sensor as claimed in claim 26, wherein said at least one optical fiber means includes a further plurality of the elongated optical fiber means embedded in the body of cementitious material in a spaced apart substantially parallel relationship to one another and substantially perpendicular to the first mentioned plurality of the optical fiber means, wherein the light transmitting means transmits light through each of the further plurality of optical fiber means, wherein further means are provided for receiving the transmitted light through each of the further plurality of optical fiber means and conveying a signal to said measuring means to provide further measurements combinable with the first mentioned measurements for essentially determining at least one of the location, width and length of crack in the body of cementitious material, the location and amount of attrition in the body of cementitious material, and the location of and the amount of the applied dynamic loading.

28. An optical fiber sensor in a body of cementitious material having sections thereof separated by a joint or crack, comprising a body of cementitious material defined by at least two sections separated from one another by one of a joint and a crack, deformable optical fiber means of elastomeric material disposed within and extending substantially parallel to the joint or crack, filler means for fixedly securing the optical fiber means in the joint or crack for effecting the deformation thereof upon movement of said sections relative to one another, means for transmitting light through the optical fiber means, and means for receiving light transmitted through the optical fiber means with the amount of light being received being dependent upon the amount of deformation of the optical fiber means.

29. In a shoe adapted to be worn on a foot of a human being and having a sole formed an elastomeric material with spaced apart upper and lower surface regions and which is sequentially deformed by sequential impacts of the foot upon the upper surface region thereof as occurring during a walking or exercise regimen, the method for measuring the amount of impact and the number of impacts in a selected region of the sole of the shoe by the steps of fixedly embedding an elongated optical fiber means formed of a core and cladding of an elastomeric material within the body of elastic material defining the sole of the shoe for conjunctive movement therewith, transmitting light through the embedded optical fiber means, measuring the amount of light transmitted through the embedded optical fiber means during a plurality of impacts of the foot upon the selected region of the sole with each change in the amount of light transmitted through the optical fiber means being indicative of the deformation of the sole caused by each of the sequential impacts of the foot upon the selected region of the sole and with the amount of each change in light transmitted through the optical fiber means being indicative of the intensity of each impact.

30. An optical fiber sensor for measuring at least one of atrophy or development occurring in an elastic component in the body of a human being, and movement of the elastic component in the body of a human being by a dynamic loading imposed by movement in the elastic component and provided by at least one of a compression load, a tension load, or a bending load, comprising an elastic component within the body of a human being, an elongated optical fiber means formed of a core and cladding of an elastomeric material embedded within the body of the human being and fixedly attached to the elastic component being measured for conjunctive movement therewith and for subjecting the elongated optical fiber means to an initial deformation, means for transmitting light through the embedded optical fiber means, and means for receiving and measuring the amount of light transmitted through the embedded optical fiber means with changes in the amount of light received being indicative of at least one of atrophy, development, and movement in the elastic component at locations contiguous to regions of the embedded optical fiber means and with the extent of any change in the amount of light attenuation from that initially measured being indicative of the measure of at least one of the atrophy, the development, and the movement in the elastic component.

31. An optical fiber sensor as claimed in claim 28, wherein the elastic component is a muscle, and wherein the optical fiber means is embedded within the muscle.

32. An optical fiber sensor as claimed in claim 28, wherein the elastic component in the human body is an organ or tumor.

33. An optical fiber sensor as claimed in claim 28, wherein the elastic component in the human body comprises at least one of muscles and tendons in a joint region.

34. A method for measuring at least one of attrition in a body of elastic material and a dynamic loading imposed upon the body of elastic material by at least one of a compression load, a tension load, or a bending load, comprising the steps of fixedly embedding an elongated optical fiber means formed of a core and cladding of an elastomeric material within a body of elastic material for conjunctive movement therewith and for subjecting the elongated optical fiber means to an initial deformation, transmitting light through the embedded optical fiber means, measuring the amount of light initially transmitted through the embedded optical fiber means with the amount of light being initially transmitted being indicative of the amount of attenuation of the light through the optical fiber means caused by the initial deformation thereof, measuring the amount of light subsequently transmitted through the embedded optical fiber means so that any changes in the initial amount of deformation in the optical fiber means as caused by at least one of the attrition of the body of elastic material and movement in internal regions of the body of elastic material contiguous to regions of the embedded optical fiber means upon the application of a dynamic loading to the body of elastic material changes the amount of light attenuation measured at the initial deformation of the optical fiber means with the extent of any change in the amount of light attenuation from that initially measured being indicative of a measure of attrition in the elastic material or a measure of movement in the body of elastic material at locations thereof contiguous to the embedded optical fiber means as caused by the application of a dynamic loading to the body of elastic material.

35. A method for measuring at least one of the attrition of and the dynamic loading applied to a body of elastic material as claimed in claim 34, wherein the elastic material is a cementitious material, an elastomer, or an elastic component contained within the body of an animal.

36. A method for measuring at least one of the attrition of and the dynamic loading applied to a body of elastic material as claimed in claim 34, wherein the elastomeric material forming at least one of the core and the cladding of the optical fiber means is silicone rubber.

37. A method for measuring at least one of the attrition of and the dynamic loading applied to a body of elastic material as claimed in claim 34, wherein the body of elastic material is body of cementitious material having upper and lower surfaces, and wherein the elongated optical fiber means is embedded in the body of cementitious material at a location intermediate to said upper and lower surfaces and extends along a plane substantially parallel to at least one of said surfaces, and further including the steps of determining the presence of a crack in the body of cementitious material by embedding the elongated optical fiber means at a location in regions of the cementitious material subject to cracking, and determining the presence of and measuring and the width of a crack in the body of cementitious material of a sufficient magnitude to apply a tension loading on the portion of the optical fiber means spanning the crack for stretching and deforming the optical fiber means and thereby changing the amount of light being transmitted therethrough with the amount light being transmitted through the optical fiber means being indicative of the width of the crack.

38. A method for measuring at least one of the attrition of and the dynamic loading applied to a body of elastic material as claimed in claim 37, including the additional steps of embedding a plurality of the elongated optical fiber means in the body of cementitious material in a spaced apart substantially parallel relationship to one another, measuring the amount of light initially transmitted through each of the embedded optical fiber means with the amount of :light being initially transmitted through each optical fiber means being indicative of the amount of attenuation of the light through each of the optical fiber means caused by the initial deformation thereof, measuring the amount of light subsequently transmitted through each of the embedded optical fiber means so that any changes from the initial amount of deformation in any of the embedded optical fiber means as caused by at least one of the attrition of the body of cementitious material, the formation of a crack inducing a tension loading in at least one of the optical fiber means, and movement in internal regions of the body of cementitious material contiguous to regions of one or more of the embedded optical fiber means upon the application of a dynamic loading to the body of cementitious material, and measuring the amount of change in light attenuation in said at least one of the optical fiber means for determining at least one of the general location and extent of attrition, the size and width of the crack, and the general location of and the amount of the applied dynamic loading.

39. A method for measuring at least one of the attrition of and the dynamic loading applied to a body of elastic material as claimed in claim 38, including the additional steps of embedding a further plurality of the elongated optical fiber means in the body of cementitious material in a spaced apart substantially parallel relationship to one another and substantially perpendicular to the first mentioned plurality of the optical fiber means, measuring the amount of light initially transmitted through each of said further embedded optical fiber means with the amount of light being initially transmitted through each of said further optical fiber means being indicative of the amount of attenuation of the light through each of said further optical fiber means caused by the initial deformation thereof, measuring the amount of light subsequently transmitted through each of the embedded optical fiber means so that any changes from the initial amount of deformation in any of the embedded optical fiber means as caused by at least one of the attrition of the body of cementitious material, the formation of a crack inducing a tension loading in one or more of the optical fiber means, and movement in internal regions of the body of cementitious material contiguous to regions of one or more of the embedded optical fiber means upon the application of a dynamic loading to the body of cementitious material, and measuring the amount of change in light attenuation in said one or more of the optical fiber means in each plurality of optical fiber means for determining at least one of: the location of attrition in the body of cementitious material and extent of attrition at said location; the location, size and width of the crack; and, the location and amount the applied dynamic loading.

40. A method for measuring at least one of the attrition of and the dynamic loading applied to a body of elastic material as claimed in claim 35, wherein the body of elastic material is a body of elastomeric material, and wherein the optical fiber means is embedded in the body of elastomeric material at a location therein subject to dynamic loadings applied to the body of elastomeric material and provided by at least one of a compression load, a tension load stretching the elastomeric material, and a bending load.

41. A method for measuring at least one of the attrition of and the dynamic loading applied to a body of elastic material as claimed in claim 35, wherein the body of elastic material is elastomeric material forming a sole of a shoe for receiving a foot of a human being with said sole having substantially parallel upper and lower surfaces and including a heel region an arch region and a ball of the foot region, wherein the optical fiber means is embedded in the sole at a location intermediate to the upper and lower surface and in at least one of the heel region and the ball of the foot region, wherein means for effecting the transmission of the light through the optical fiber means and means for receiving the transmitted light are embedded in the sole, and wherein the dynamic loading is a compression loading provided by the foot impacting the body of elastomeric material.

42. A method for measuring at least one of the attrition of and the dynamic loading applied to a body of elastic material as claimed in claim 35, wherein the elastic component within the body of an animal is a muscle, organ, or muscle and tendons in a joint region with the elongated optical fiber means embedded in the elastic component at a location subject attrition and to dynamic loadings applied by the muscle as provided by at least one of a compression load, a tension load stretching the elastic component, and a bending load.

43. A method for measuring the curing rate of cementitious material, comprising the steps of embedding an elongated optical fiber means formed of a core and cladding of an elastomeric material within a body of freshly poured and uncured cementitious material containing a substantial amount of water, transmitting light through the embedded optical fiber means, measuring the amount of light initially transmitted through the embedded optical fiber means with the amount of light attenuation being indicative of the amount of water present in the uncured cementitious material and with said amount of water decreasing as the cementitious material undergoes curing, measuring the changes in the amount of light subsequently transmitted through the embedded optical fiber means and the rate of said changes with the extent of any change from the initial amount of light attenuation in the optical fiber means being indicative of extent of curing taking place in the cementitious material and with the rate of the change in the amount of light being transmitted through the optical fiber means being indicative of the rate of the curing taking place in the cementitious material.

44. A method as claimed in claim 43, wherein the light is transmitted into the optical fiber means by light emitting means, and including the additional steps of compensating for variations in ambient temperature and variations in voltage supplied to the light emitting means which affect the amount of light transmitted into the optical fiber means by the light emitting means.

45. A method as claimed in claim 43 including measuring of at least one of the attrition of and the dynamic loading applied to the body of cementitious material after the curing thereof by the steps comprising, measuring the amount of light transmitted through the embedded optical fiber means after obtaining a substantial steady amount of light transmitted through the optical fiber means indicative of the curing of the cementitious material with the amount of light being initially transmitted through the optical fiber means in the cured cementitious material being indicative of the amount of attenuation of the light through the optical fiber means being due the deformation thereof in the cured cementitious material, measuring the amount of light subsequently transmitted through the embedded optical fiber means so that any changes in the initial amount of deformation in the optical fiber means as caused by at least one of the attrition of the body of cementitious material and movement in internal regions of the body of elastic material contiguous to regions of the embedded optical fiber means upon the application of a dynamic loading to the body of cementitious material changes the amount of light attenuation measured at the initial deformation of the optical fiber means with the extent of any change in the amount of light attenuation from that initially measured being indicative of the extent of attrition in the cementitious material or the extent of movement in the body of elastic material at locations contiguous to the embedded optical fiber means as caused by the application of a dynamic loading to the body of cementitious material.

46. In a shoe adapted to be worn on a foot of a human being and having a sole formed an elastomeric material with spaced apart upper and lower surface regions and which is sequentially deformed by sequential impacts of the foot upon the upper surface region thereof as occurring during a walking or exercise regimen, the method for measuring the amount of impact and the number of impacts in a selected region of the sole by the steps of fixedly embedding an elongated optical fiber means formed of a core and cladding of an elastomeric material within the sole for conjunctive movement therewith, transmitting light through the embedded optical fiber means, measuring the amount of light transmitted through the embedded optical fiber means during a plurality of impacts of the foot upon the selected region of the sole with each change in the amount of light transmitted through the optical fiber means being indicative of the deformation of the sole caused by a single impact of the foot upon the selected region of the sole and with the amount of each change in light transmitted through the optical fiber means being indicative of the intensity of each impact.

47. In the method of claim 46 including the additional step of determining the number of impacts of the foot upon the selected region of the sole over a predetermined time period by measuring the number of changes in the amount of light transmitted during a predetermined duration.

48. A method for measuring at least one of atrophy or development occurring in an elastic component in the body of an animal and movement of the elastic component in the body of the animal as provided by a dynamic loading imposed on the elastic component by at least one of a compression load, a tension load, or a bending load, said method comprising the steps of embedding an elongated optical fiber means formed of a core and cladding of an elastomeric material within the body of the animal and fixedly attached to the elastic component being measured for conjunctive movement therewith and for subjecting the elongated optical fiber means to an initial deformation, transmitting light through the embedded optical fiber means, measuring the amount of light initially transmitted through the embedded optical fiber means with the amount of light being initially transmitted being indicative of the amount of attenuation of the light through the optical fiber means caused by the initial deformation thereof, and measuring the amount of light subsequently transmitted through the embedded optical fiber means so that any changes in the initial amount of deformation in the optical fiber means as caused by at least one of the atrophy, development, and movement in the elastic component at locations contiguous to regions of the embedded optical fiber means and with the extent of any change in the amount of light attenuation from that initially measured being indicative of the extent of at least one of atrophy, development, and movement in the elastic component in the body of the animal.

49. A method for measuring at least one of atrophy or development occurring in an elastic component in the body of an animal and movement of the elastic component in the body of an animal by a dynamic loading as claimed in claim 48, wherein the elastic component is one of a muscle, an organ, or muscle or tendons in a joint area, and wherein the optical fiber means is at least substantially embedded within the elastic component.

50. A method for measuring at least one of atrophy or development occurring in an elastic component in the body of an animal and movement of the elastic component in the body of an animal by a dynamic loading as claimed in claim 48, wherein the elastic component in the body of the animal is a tumor.

* * * * *